US012723468B2

(12) United States Patent
Moss et al.

(10) Patent No.: US 12,723,468 B2

(45) Date of Patent: Sep. 1, 2026

(54) ADJUSTABLE LADDERS, LADDER COMPONENTS, AND RELATED METHODS

(71) Applicant: Little Giant Ladder Systems, LLC, Springville, UT (US)

(72) Inventors: N. Ryan Moss, Mapleton, UT (US); Gary Jonas, Springville, UT (US); Brian Russell, Salt Lake City, UT (US); Sean R. Peterson, Santaquin, UT (US)

(73) Assignee: LITTLE GIANT LADDER SYSTEMS, LLC, Springville, UT (US)

( * ) Notice: Subject to any disclaimer, the term of this patent is extended or adjusted under 35 U.S.C. 154(b) by 0 days.

(21) Appl. No.: 18/584,724

(22) Filed: Feb. 22, 2024

(65) Prior Publication Data

US 2024/0191574 A1 Jun. 13, 2024

Related U.S. Application Data

(63) Continuation of application No. 18/356,079, filed on Jul. 20, 2023, which is a continuation of application (Continued)

(51) Int. Cl.
*E06C 7/44* (2006.01)
*E06C 7/42* (2006.01)

(52) U.S. Cl.
CPC .................. *E06C 7/44* (2013.01); *E06C 7/42* (2013.01); *E06C 7/423* (2013.01); *Y10T 292/696* (2015.04)

(58) Field of Classification Search
CPC ..... E06C 7/42; E06C 7/44; E06C 7/46; E06C 7/426; Y10T 292/0969; Y10T 292/0989; Y10T 292/0961; Y10T 292/696
See application file for complete search history.

(56) References Cited

U.S. PATENT DOCUMENTS 395,161 A * 12/1888 Maxon ...................... B66F 1/06 254/108
712,120 A 10/1902 Cowan
(Continued)

FOREIGN PATENT DOCUMENTS

CN 1157987 A 8/1997
CN 202441248 U 9/2012
(Continued)

OTHER PUBLICATIONS

Extended European Search Report for EP Application No. 14842695.0 dated Mar. 23, 2017.
(Continued)

*Primary Examiner* — Colleen M Chavchavadze
(74) *Attorney, Agent, or Firm* — Dorsey & Whitney LLP

(57) ABSTRACT

Ladders, ladder components, adjustment mechanisms and related methods are provided herein. In one embodiment, a ladder may include an adjustment mechanism for adjusting, for example, a leveler, a stabilizer, or any two relatively displaceable components of the ladder. The adjustment mechanism may include an actuating mechanism having a first structure and a second structure slidably disposed adjacent the first structure, the second structure having a plurality of engagement surfaces. A body is coupled with the first structure. At least two engagement pins are slidably displaceable relative to the body, wherein the plurality of engagement surfaces and the at least two engagement pins are arranged such that only a single engagement pin of the at least two engagement pins is in abutting engagement with an engagement surface of the plurality of engagement surfaces at one time. At least one biasing member is configured to bias the at least two engagement pins towards engagement with the engagement surfaces.

15 Claims, 24 Drawing Sheets

Related U.S. Application Data

No. 16/356,833, filed on Mar. 18, 2019, now Pat. No. 11,746,596, which is a continuation of application No. 15/791,091, filed on Oct. 23, 2017, now Pat. No. 10,233,693, which is a continuation of application No. 14/479,035, filed on Sep. 5, 2014, now Pat. No. 9,797,194.

(60) Provisional application No. 61/883,650, filed on Sep. 27, 2013, provisional application No. 61/874,882, filed on Sep. 6, 2013.

(56) References Cited

U.S. PATENT DOCUMENTS

| | | | | | |
|---|---|---|---|---|---|
| 1,177,069 | A * | 3/1916 | Verow | E06C 7/44 182/203 |
| 1,329,740 | A * | 2/1920 | Barron | E06C 7/44 182/205 |
| 1,733,338 | A * | 10/1929 | Enke | E06C 7/44 182/204 |
| 1,928,158 | A * | 9/1933 | Ruse | E06C 7/44 182/125 |
| 2,109,886 | A | 3/1938 | Lewis | |
| 2,392,527 | A | 1/1946 | Divil | |
| 2,602,580 | A * | 7/1952 | Noel | E06C 7/44 182/203 |
| 2,623,679 | A * | 12/1952 | Agombar | E06C 7/46 182/109 |
| 2,936,849 | A * | 5/1960 | Larson | E06C 7/44 182/204 |
| 2,975,857 | A | 3/1961 | Suroff et al. | |
| 3,484,814 | A | 12/1969 | Meehan | |
| 3,861,500 | A | 1/1975 | Dempsey | |
| 3,948,352 | A * | 4/1976 | Larson | E06C 7/44 182/207 |
| 3,998,293 | A | 12/1976 | Raia | |
| 4,011,926 | A | 3/1977 | Larson et al. | |
| 4,014,406 | A * | 3/1977 | Easton | E06C 7/44 182/204 |
| 4,079,814 | A | 3/1978 | Larson | |
| 4,147,231 | A | 4/1979 | Chantler et al. | |
| 4,210,224 | A | 7/1980 | Kummerlin et al. | |
| 4,332,308 | A | 6/1982 | Larson | |
| 4,407,045 | A | 10/1983 | Boothe | |
| 4,602,890 | A | 7/1986 | Duda | |
| 4,606,432 | A * | 8/1986 | Belt | E06C 7/44 248/188.8 |
| 4,722,420 | A * | 2/1988 | Arthurs | E06C 7/48 182/201 |
| 5,074,377 | A * | 12/1991 | Krause | E06C 7/42 182/209 |
| 5,107,958 | A | 4/1992 | Johnson | |
| D340,773 | S | 10/1993 | Bartnicki et al. | |
| 5,273,133 | A * | 12/1993 | Thocher | E06C 7/44 182/202 |
| 5,305,851 | A | 4/1994 | Katson et al. | |
| 5,472,301 | A * | 12/1995 | Wallen | B61D 45/001 410/151 |
| 5,497,850 | A | 3/1996 | Patterson | |
| 5,526,898 | A | 6/1996 | Clark | |
| 5,595,410 | A | 1/1997 | Wilson et al. | |
| D380,277 | S * | 6/1997 | Bonn | D25/68 |
| 5,678,656 | A * | 10/1997 | Lanzafame | E06C 7/44 182/205 |
| 5,704,451 | A | 1/1998 | King | |
| 5,722,507 | A | 3/1998 | Kain | |
| 5,845,744 | A * | 12/1998 | Beck | E06C 7/44 182/204 |
| 5,890,856 | A * | 4/1999 | Huang | B60P 7/15 410/151 |
| 5,988,963 | A * | 11/1999 | Shiau | B60P 7/15 410/151 |
| D422,717 | S | 4/2000 | Bartnicki et al. | |
| 6,050,740 | A | 4/2000 | Dziedzic | |
| 6,073,726 | A | 6/2000 | Mccrystal | |
| 6,131,928 | A * | 10/2000 | Tung | A45C 13/262 280/37 |
| 6,247,882 | B1 * | 6/2001 | Huang | B60P 7/15 410/151 |
| 6,361,086 | B1 | 3/2002 | Robbins et al. | |
| 6,374,947 | B1 * | 4/2002 | Nurkiewicz | E06C 7/44 182/201 |
| 6,398,445 | B1 * | 6/2002 | Matali Badia | F16B 7/105 403/379.5 |
| 6,401,866 | B1 * | 6/2002 | Roy | E06C 7/44 182/205 |
| 6,450,292 | B1 | 9/2002 | Sheffield | |
| 6,595,326 | B1 * | 7/2003 | Dean | E06C 7/44 182/108 |
| 6,729,440 | B1 | 5/2004 | Bailey | |
| 6,779,632 | B1 | 8/2004 | Parks, III | |
| D530,025 | S | 10/2006 | Patton et al. | |
| D531,322 | S | 10/2006 | Patton et al. | |
| D549,356 | S | 8/2007 | Gibson | |
| D597,685 | S | 8/2009 | Gibson et al. | |
| 7,931,123 | B2 | 4/2011 | Moldthan et al. | |
| 8,162,576 | B1 * | 4/2012 | Chou | B60P 7/15 410/151 |
| 8,186,481 | B2 | 5/2012 | Moss et al. | |
| 8,210,313 | B2 | 7/2012 | Astor | |
| 8,272,478 | B2 | 9/2012 | Astor et al. | |
| 8,365,863 | B2 | 2/2013 | Astor | |
| 8,365,865 | B2 | 2/2013 | Moss et al. | |
| 8,376,085 | B2 | 2/2013 | Astor et al. | |
| 8,453,796 | B2 | 6/2013 | Astor et al. | |
| 8,528,696 | B2 | 9/2013 | Astor | |
| 8,616,336 | B2 | 12/2013 | Dangrow et al. | |
| 8,701,831 | B2 | 4/2014 | Moss et al. | |
| D766,461 | S | 9/2016 | Peterson et al. | |
| D766,462 | S | 9/2016 | Peterson et al. | |
| D766,463 | S | 9/2016 | Peterson et al. | |
| D777,350 | S | 1/2017 | Peterson et al. | |
| 2002/0084143 | A1 | 7/2002 | Roy | |
| 2005/0092551 | A1 * | 5/2005 | Caldwell | E06C 7/46 182/204 |
| 2005/0274571 | A1 | 12/2005 | Simpson et al. | |
| 2008/0029339 | A1 | 2/2008 | Yewer | |
| 2011/0011678 | A1 * | 1/2011 | Sheffield | E06C 1/39 182/172 |
| 2012/0211305 | A1 | 8/2012 | Moss et al. | |
| 2012/0324701 | A1 | 12/2012 | Dangrow et al. | |
| 2014/0202793 | A1 | 7/2014 | Jonas et al. | |

FOREIGN PATENT DOCUMENTS

| | | | | |
|---|---|---|---|---|
| DE | 8814195.0 | U1 | 1/1989 | |
| DE | 4403001 | A1 * | 8/1994 | E06C 1/18 |
| EP | 0899467 | A1 | 3/1999 | |
| GB | 2223792 | A * | 4/1990 | E04G 1/32 |
| GB | 2450696 | A | 1/2009 | |
| KR | 200146389 | Y1 | 6/1999 | |
| WO | 9838432 | A1 | 9/1998 | |

OTHER PUBLICATIONS

Fourth Office Action dated Aug. 20, 2018 for Chinese Application No. 201480048676.6.

PCT International Search Report for corresponding PCT International Patent Application No. PCT/US2014/054353, mailed Feb. 4, 2015.

Search Report issued by the Chinese State Intellectual Property Office issued Aug. 17, 2016.

* cited by examiner

ADJUSTABLE LADDERS, LADDER COMPONENTS, AND RELATED METHODS

CROSS-REFERENCE TO RELATED APPLICATIONS

The present application is a continuation of U.S. patent application Ser. No. 18/356,079 entitled ADJUSTABLE LADDERS, LADDER COMPONENTS AND RELATED METHODS, filed 20 Jul. 2023, which is a continuation of U.S. patent application Ser. No. 16/356,833 entitled ADJUSTABLE LADDERS, LADDER COMPONENTS AND RELATED METHODS, filed 18 Mar. 2019, now U.S. Pat. No. 11,746,596, which is a continuation of U.S. patent application Ser. No. 15/791,091 entitled ADJUSTABLE LADDERS, LADDER COMPONENTS AND RELATED METHODS, filed 23 Oct. 2017, now U.S. Pat. No. 10,233,693, which is a continuation of U.S. patent application Ser. No. 14/479,035 entitled ADJUSTABLE LADDERS, LADDER COMPONENTS AND RELATED MATTERS, filed 5 Sep. 2014, now U.S. Pat. No. 9,797,194, which claims the benefit of U.S. Provisional Patent Application No. 61/874,882, filed 6 Sep. 2013, entitled ADJUSTABLE LADDERS, LADDER COMPONENTS AND RELATED METHODS, and U.S. Provisional Patent Application No. 61/883,650, filed 27 Sep. 2013, entitled STEP LADDERS, the disclosures of which are incorporated by reference herein in their entireties.

TECHNICAL FIELD

The present invention relates generally to ladders and, more particularly, to ladders having components and features to provide selective adjustability as well as methods of making and using such ladders.

BACKGROUND

Ladders are conventionally utilized to provide a user thereof with improved access to elevated locations that might otherwise be inaccessible. Ladders come in many shapes and sizes, such as straight ladders, extension ladders, stepladders, and combination step and extension ladders. So-called combination ladders (sometimes referred to as articulating ladders) may incorporate, in a single ladder, many of the benefits of multiple ladder designs.

Straight ladders, extension ladders or combination ladders (when configured as straight or an extension ladder), are ladders that are conventionally positioned against an elevated surface, such as a wall or the edge of a roof, to support the ladder at a desired angle. A user then ascends the ladder to obtain access to an elevated area, such as to an upper area of the wall or access to the roof. A pair of feet or pads, one being coupled to the bottom of each side rail, is conventionally used to engage the ground, a floor or some other supporting surface.

Step ladders and combination ladders (when configured as a step ladder) are generally considered to be self-supporting in that they include a first rail assembly which includes steps or rungs that is coupled to a second rail assembly or other support structure. The first and second rail assemblies are typically positioned at an acute angle relative to each other so that there are multiple feet or support members—at least three, but typically four—to support the ladder in a free standing position. Thus, the ladder may be used without the need to lean the ladder against a wall or other vertical support structure.

While the size and configuration of ladders may vary considerably, the rails of such ladders are conventionally spaced apart approximately 16 to 18 inches. In some applications, such as when the ladder is very tall, it may become desirable to have the feet spaced apart a greater distance to provide a widened footprint and improve stability. Such may also be the case regardless of the type of ladder (e.g., extension ladder or step ladder). Additionally, it oftentimes desirable to use a ladder in a location where the ground or other supporting surface is not level. Positioning the ladder on such an uneven support surface, without taking further action, results in the ladder being positioned at an undesirable lateral angle (i.e., so that the rungs or steps are not level) and likely makes use of the ladder unsafe.

There have been various efforts to remedy such issues with conventional ladders. For example, various embodiments of leg levelers—accessories that attach to the bottom portion of a ladder's rails—have been utilized to compensate for uneven surfaces by "extending" the length of the rail. Additionally, various embodiments of ladder stabilizers have been utilized wherein additional structural components are coupled to the ladder rails to alter the "footprint" of the ladder, typically making the footprint wider, in an effort to improve the stability to such ladders.

However, such efforts to provide additional stability to ladders have also had drawbacks. Often, leg levelers and stabilizers are provided as aftermarket items and are attached to the ladder by an end user. Such installation may not always be done with the appropriate care and attention. Additionally, such attachments or accessories are often intended to be removed after use meaning that they may be lacking in their structural integrity in their coupling with the ladder.

There is a continuing desire in the industry to provide improved functionality of ladders while maintaining or improving the safety and stability of such ladders. Thus, it would be advantageous to provide ladders with adjustable components that enable the ladder to be used on a variety of support surfaces while also perhaps providing enhanced stability. It would also be advantageous to provide adjustment mechanisms for ladders that enhance the utility of the ladder. Further, it would be advantageous to provide methods related to the manufacture and use such ladders, components and mechanisms.

BRIEF SUMMARY OF THE INVENTION

In accordance with the present invention, various embodiments of ladders, actuating mechanisms, leveler mechanisms and related methods are provided.

In accordance with one embodiment, a ladder is provided that includes a first rail assembly. The first rail assembly comprises: a pair of inner rails and a pair of outer rails, the pair of inner rails being slidably disposed in a upper portion of pair of outer rails; a first plurality of rungs coupled between the pair of inner rails; and a second plurality of rungs coupled between the pair of outer rails. The ladder additionally includes a pair of leveler mechanisms, each leveler mechanism being associated with one of the pair of outer rails. Each leveler mechanism includes a leg member slidably disposed within a lower portion of its associated outer rail and an actuating mechanism configured to enable longitudinal movement in an a first direction and a second, opposite direction when actuated, but allow movement in only the first direction when not actuated. A spring is configured to maintain a biasing force on the leg member in the second direction.

In one particular embodiment, the actuating mechanism includes a first engagement pin and a second engagement pin, each of the first and second engagement pins being sized and configured to engage openings formed in the leg member.

In one embodiment, the openings include a first column of openings and a second column of openings, wherein the first column of openings is longitudinal offset from the second column of openings.

In one embodiment, each of the openings in the first column of openings and each of the openings in the second column of openings include a substantially planar upper surface and a substantially arcuate lower surface.

In one embodiment, the first and second engagement pins and the first and second columns of openings are arranged such that the first engagement pin is in a disengaged state while the second engagement pin is in an engaged state.

In one embodiment, the ladder may further include a pull ring pivotally coupled with each of the engagement pins.

In one embodiment, each of the engagement pins includes a hole or an elongated slot formed therein and wherein a portion of the pull ring is pivotally and slidably disposed in the hole or elongated slot of each engagement pin.

In one embodiment, the spring includes a first end coupled with one of the outer rails and a second end coupled with the leg member of one of the leveler mechanisms.

In one embodiment, the leveler mechanism further includes a laterally protruding stop member coupled with the leg member.

In accordance with another aspect of the invention, an actuating mechanism is provided. The actuating mechanism includes a body, a first engagement pin at least partially disposed within the body, a second engagement pin at least partially disposed within the body, a first biasing member disposed between the first engagement pin and a portion of the body, a second biasing member disposed between the second engagement pin and another portion of the body, and a pull ring having a first portion pivotally coupled with the first engagement and a second portion pivotally coupled with the second engagement pin.

In one embodiment, the first engagement pin includes a hole or an elongated slot and wherein the first portion of the pull ring is slidably disposed within the hole or elongated slot of the first engagement pin; the second engagement pin includes a hole or an elongated slot and wherein the second portion of the pull ring is slidably disposed within the hole or elongated slot of the second engagement pin.

In one embodiment, each of the engagement pins includes a substantially cylindrical body portion and an angled engagement surface. The angled engagement surface of each of the first and second engagement pins includes a substantially planar surface which may be positioned at an angle of approximately 60° relative to a longitudinal axis extending through the cylindrical body. In one embodiment, the engagement surface of the first engagement pin and the engagement surface of the second engagement pin are substantially coplanar.

In accordance with another aspect of the invention, a method of modifying a ladder is provided. The method includes unlocking a first rail assembly from a second rail assembly, sliding the first rail assembly relative to the second rail assembly until the first assembly is uncoupled from the second rail assembly, providing a third rail assembly, the third rail assembly having a leveler mechanism coupled with a rail, sliding the third rail assembly onto the second rail assembly, and locking the third rail assembly in a desired position relative to the second rail assembly.

In one embodiment, the acts of unlocking, sliding the first rail assembly, sliding the third rail assembly and locking are accomplished by a user without the aid of tools.

In one embodiment, providing a third rail assembly, includes providing a rail assembly having a first leveler mechanism coupled with a first rail and a second leveler mechanism coupled with a second rail.

In accordance with another embodiment of the present invention, an actuating mechanism is provided which comprises a first structure and a second structure slidably disposed adjacent the first structure, the second structure having a plurality of engagement surfaces. The mechanism further includes a body coupled with the first structure and at least two engagement pins slidably displaceable relative to the body, wherein the plurality of engagement surfaces and the at least two engagement pins are arranged such that only a single engagement pin of the at least two engagement pins is in abutting engagement with an engagement surface of the plurality of engagement surfaces at one time. The mechanism additionally includes at least one biasing member configured to bias the at least two engagement pins towards engagement with the engagement surfaces.

In one embodiment, act the plurality of engagement surfaces are arranged in at least two laterally spaced columns. In one particular embodiment, the at least two laterally spaced columns include a first column having a first plurality of engagement surfaces and a second column having a second plurality of engagement surfaces, wherein the first plurality of engagement of surfaces are longitudinally staggered relative to the second plurality of engagement surfaces along a length of the second structure.

In one embodiment, the plurality of engagement surfaces are arranged in a single column.

In one embodiment, the at least two engagement pins include 3 or more engagement pins.

In one embodiment, the engagement pins are each configured as a dog.

In one embodiment, each of the at least two engagement pins includes an angled engagement surface and an abutment surface.

In one embodiment, the engagement pins each include a substantially cylindrical portion.

In one embodiment, the engagement surfaces are configured as a plurality of scallops.

In one embodiment, the engagement surfaces are configured as openings.

Additional features and various advantages of the invention will become apparent upon review of the detailed description and associated drawings. It is noted that features or components of one described embodiment may be combined with features or components or another described embodiment without limitation.

BRIEF DESCRIPTION OF THE SEVERAL VIEWS OF THE DRAWINGS

The foregoing and other advantages of the invention will become apparent upon reading the following detailed description and upon reference to the drawings in which.

DETAILED DESCRIPTION OF THE INVENTION

Figure 1:
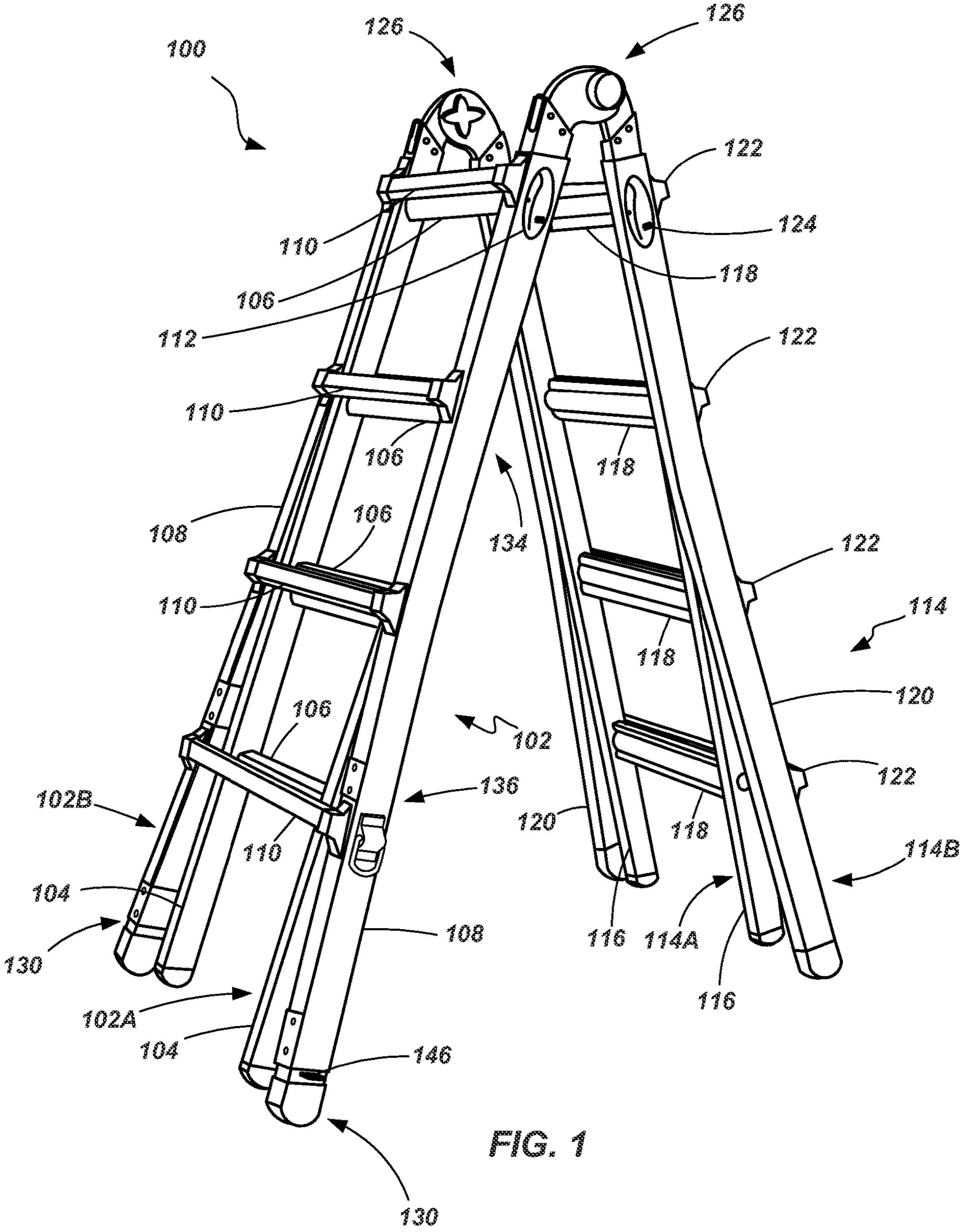
FIG. 1 is a perspective view of a ladder in accordance with an embodiment with the present invention.

Referring to FIG. 1, a combination ladder 100 is shown. The combination ladder 100 includes a first rail assembly 102 including an inner assembly 102A slidably coupled with an outer assembly 102B. The inner assembly 102A includes a pair of spaced apart rails 104 coupled with a plurality of rungs 106. Likewise, the outer assembly 102B includes a pair of spaced apart rails 108 coupled to a plurality of rungs 110. The rails 104 of the inner assembly 102A are slidably coupled with the rails 106 of the outer assembly 102B. The inner and outer assemblies 102A and 102B may be selectively locked relative to each other such that one or more of their respective rungs 106 and 110 are aligned with each other. A locking mechanism 112 may be configured to engage a portion of the inner rail assembly 102A and the outer rail assembly 102B so as to selectively lock the two assemblies 102A and 102B relative to each other. While only a single locking mechanism 112 is shown due to the perspective of the ladder represented in FIG. 1, a second, similar locking mechanism is coupled to the other side of the rail assembly 102.

The combination ladder 100 also includes a second rail assembly 114 that includes an inner assembly 114A slidably coupled with an outer assembly 114B. The inner assembly 114A includes a pair of rails 116 coupled with a plurality of rungs 118 and is configured similar to the inner assembly 102A of the first rail assembly 102A described hereinabove. Likewise, the outer assembly 114B includes a pair of rails 120 coupled with a plurality of rungs 122 and is configured similar to the outer assembly 102B of the first rail assembly 102 described hereinabove. Locking mechanisms 124 may be associated with inner and outer assemblies 114A and 114B to enable selective positioning of the inner assembly 114A relative to the outer assembly 114B as described hereinabove with respect to the first rail assembly 102.

One exemplary locking mechanism that may be used with the first and second rail assemblies 102 and 114 is described in U.S. Pat. No. 8,186,481, issued May 29, 2012, the disclosure of which is incorporated by reference herein in its entirety. While the locking mechanism described in U.S. Pat. No. 8,186,481 is generally described in conjunction with an embodiment of an adjustable step ladder, such a locking mechanism may by readily used with an embodiment such as the presently described combination ladder as well. It is additionally noted that, in one embodiment, the rail assemblies 102 and 114 may be configured similar to those which are described in U.S. Pat. No. 4,210,224 to Kummerlin, the disclosure of which is incorporated by reference in its entirety. Of course, other configurations of rail assemblies may be utilized.

The first rail assembly 102 and the second rail assembly 114 are coupled to each other may way of a pair hinge mechanisms 126. Each hinge mechanism 126 may include a first hinge component coupled with a rail of the first rail assembly's inner assembly 102A and a second hinge component coupled with a rail of the second rail assembly's inner assembly 114A. The hinge components of a hinge pair 126 rotate about a pivot member such that the first rail assembly 102 and the second rail assembly 114 may pivot relative to each other. Additionally, the hinge mechanisms 126 may be configured to lock their respective hinge components (and, thus, the associated rails to which they are coupled) at desired angles relative to each other. One example of a suitable hinge mechanism is described in U.S. Pat. No. 4,407,045 to Boothe, the disclosure of which is incorporated by reference herein in its entirety. Of course other configurations of hinge mechanisms are also contemplated as will be appreciated by those of ordinary skill in the art.

The combination ladder 100 is constructed so as to assume a variety of states or configurations. For example, using the locking mechanisms (112 or 124) to adjust a rail assembly (102 or 114) enables the ladder 100 to adjust in height. More specifically, considering the first rail assembly 102, as the rail assembly 102 is adjusted—with the outer assembly 102B being displaced relative to the inner assembly 102A—the associated locking mechanisms 112 engages the inner and outer assemblies (102A and 102B) when they are at desired relative positions with the rungs (106 and 110) of the inner and outer assemblies (102A and 102B) at a desired vertical spacing relative to each other. At some of the adjustment heights of the rail assembly 102, at least some of their respective rungs (106 and 110) align with each other (such as shown in FIG. 1). The second rail assembly 114 may be adjusted in a similar manner.

Considering the embodiment shown in FIG. 1, adjustment of the rail assemblies 102 and 114 enables the ladder 100 to be configured as a step ladder with, for example, four effective rungs at a desired height (as shown in FIG. 1), or to be configured as a step ladder that is substantially taller having five, six, seven or eight effective rungs, depending on the relative positioning of the inner and outer assemblies. However, it is noted that the inner and outer rail assemblies (e.g., 102A and 102B) may be configured with more or fewer rungs than four. It is also noted that the first rail assembly 102 and the second rail assembly 114 do not have to be adjusted to similar heights (i.e., having the same number of effective rungs). Rather, if the ladder is used on an uneven surface (e.g., on stairs), the first rail assembly 102 may be adjusted to one height while the second rail assembly 114 may be adjusted to a different height in order to compensate for the slope of the supporting surface, for use on a set of stairs, or in a variety of other scenarios where the ground or support surface may exhibit a change in elevation between the first and second rails assemblies 102 and 114.

Additionally, the hinge mechanisms 126 provide for additional adjustability of the ladder 100. For example, the hinge pairs 126 enable the first and second rail assemblies 102 and 114 to be adjusted to a variety of angles relative to each other. As shown in FIG. 1, the first and second rail assemblies 102 and 114 may be configured at an acute angle relative to each other such that the ladder may be used as a self-supporting ladder, similar to a step ladder. However, the first and second rail assemblies 102 and 114 may be rotated or pivoted about the hinge mechanisms 126 so that they extend from one another in substantially the same plane (i.e., exhibiting an angle of substantially 180° with respect to each other) with the hinge mechanisms 126 locking them in such an orientation. When configured in this manner, the ladder 100 may be used as an extension ladder. Moreover, each of the first and second assemblies 102 and 114 are still adjustable as to height (i.e., through the relative displacement of their respective inner and outer assemblies). It is additionally noted that the rungs of the various assemblies (i.e., rungs 106, 110, 118 and 122) are configured to have support surfaces on both the tops and the bottoms thereof so as to enable their use in either a step ladder configuration or an extension ladder configuration.

The first rail assembly 102 additionally includes an integrated leveler mechanism 130 associated with each rail 108 of the outer assembly 102B. The leveler mechanisms 130 may be independently actuated to compensate for an uneven support surface (e.g., sloping ground, a step on one side of the ladder, etc.) upon which the first assembly 102 may be positioned. As will be discussed in further detail below, in certain embodiments, the leveler mechanisms 130 may be deployed or extended in a "hands-free" manner and include a "no-catch" release/actuating mechanism to avoid inadvertent release of the leveler mechanism 130 while, for example, a user is standing on the ladder 100.

Figure 2A:
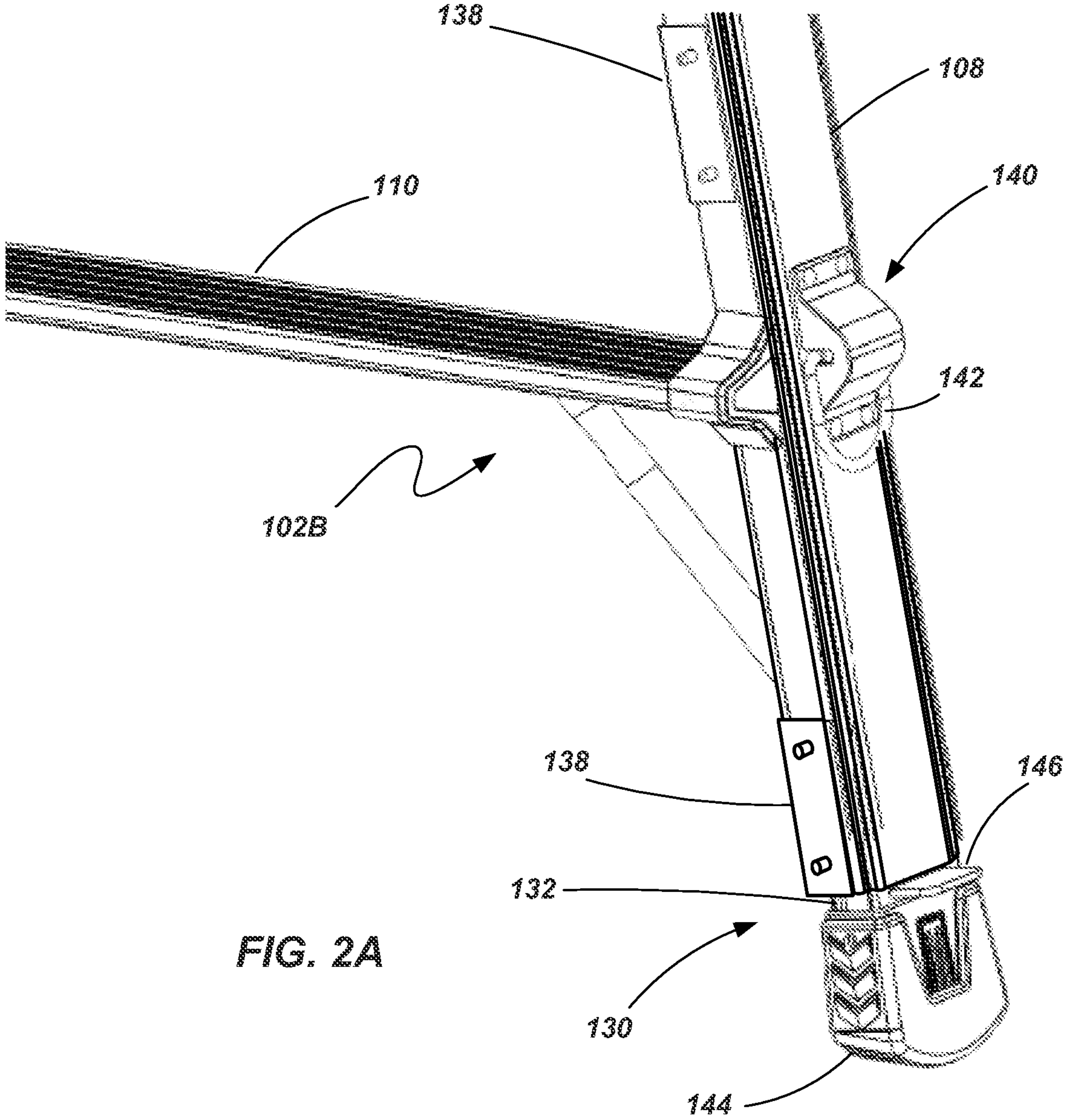
FIGS. 2A and 2B show a portion of the ladder depicted in FIG. 1, including a leveler mechanism in two different positions according to an embodiment of the present invention.
Figure 2B:
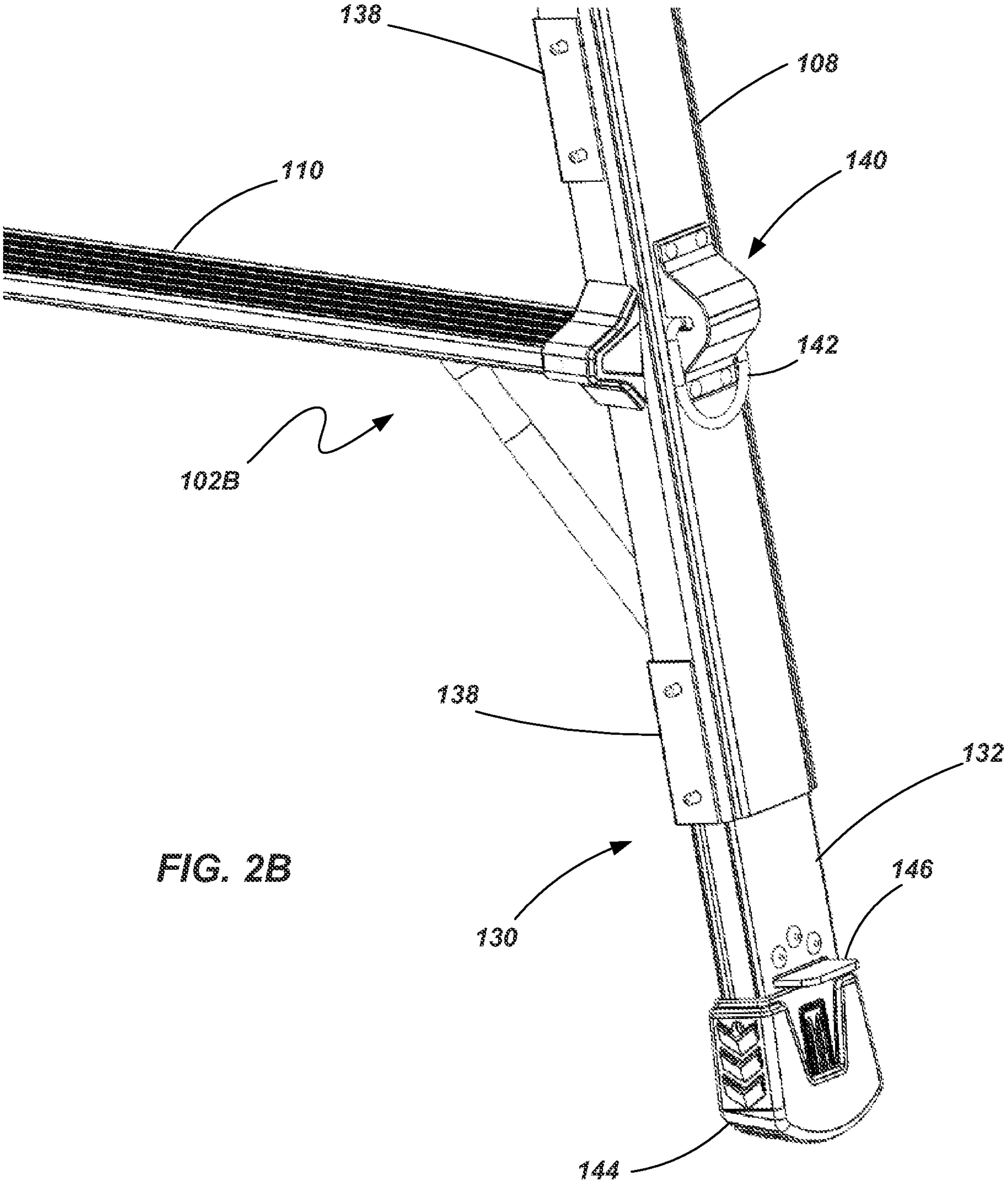

Referring to FIGS. 2A and 2B, an enlarged view is shown of a portion of an outer assembly 102B depicting a number of components of an integrated leveler mechanism 130. In the embodiment shown, the rail 108 of the outer assembly 102B may be formed substantially as a channel (e.g., a C-channel) such that various portions of the inner rail assembly 102A, as well as portions of the leveler mechanism 130, may be at least partially disposed within the channel. As shown in FIG. 1, the rails 108 of the outer assembly may generally include an upper portion 134 and a lower portion 136. In the embodiment shown, a portion of the inner assembly 102A (e.g., the rails 104 of the inner assembly 102A) is disposed in the channel defined by the upper portion 134 of each rail 104 while various components of the leg leveler 130 are at least partially disposed in the lower portion 136. For example, the leveler mechanism 130 includes a longitudinal structural component, referred to herein as a leg or leg member 132, that is disposed within the channel of the rail 108 and is selectively displaceable within the channel in a longitudinal direction that generally corresponds with the length of the lower portion 136 of the rail 108. One or more brackets 138 may be coupled to the outer rail 108 to enable the longitudinal sliding of the leg member 132 within the rail's channel while keeping the leg member 132 from becoming laterally displaced from the rail 108. For example, the brackets 138 may also be formed as a C-channel with each being coupled with a portion of the rail 108 to effectively form a boxed or rectangular cross-sectional shape through which the leg member 132 may be longitudinally displaced relative to the rail 108. The brackets 138 may be coupled with rail 108 by a variety of means including mechanical fasteners (e.g. rivets, screws, or bolts), adhesives, welding, brazing or other appropriate means.

The leveler mechanism 130 may also include an actuating mechanism 140 that, in some embodiments, enables the leg member to be displaced in a generally downward direction (when in the orientation shown in FIGS. 2A and 2B) to an extended position (see FIG. 2B) without the need to have a user affirmatively actuate the actuating mechanism 140, but requires a user to affirmatively apply a force to a portion of the actuating mechanism 140 in order to enable the leg 132 to be displaced in the opposite direction to a retracted state (see FIG. 2A). Application of a force may be effected in a number of ways as will be appreciated by those of ordinary skill in the art. In one embodiment, force may be applied by laterally pulling on a pull ring 142 (e.g., a D-ring) or other similar structure in a direction that is substantially perpendicular to the rail 108. Operation of the actuating mechanism 140 will be discussed in further detail below.

The leveler mechanism 130 may further include a foot 144 coupled to a lower end of the leg members 132 for engagement with the ground or other supporting surface. The foot 144 may be configured to provide substantial friction or "grip" when engaged with a supporting surface. One example of a foot that may be used the leveler mechanism includes a snap-on foot such as described in U.S. Patent Application Publication No. 2012/0211305 filed on Feb. 22, 2012, the disclosure of which is incorporated by reference herein in its entirety. Other feet may include, for example, spikes or other structure for penetrating the ground such as is used in many extension ladders.

A stop member 146 may be coupled with the leg member 132, the foot 144 or both, and serve to limit the travel of the leg member 132 as it is displaced upwards within the channel of the rail 108 (e.g., by abutting the rail 108 when in the retracted state). Additionally, or alternatively, the stop member 146 may act as an engagement surface for a user to abut with their own foot (or hand, if desired) so as to displace the leg member 132 downward. While shown as being positioned on the laterally outer portion of the leg member 132, in other embodiments, the stop member 146 may be positioned on a laterally inner portion of the leg member 132 or on a front or rear facing portion of the leg member 132. Additionally, while only one stop member 146 is shown, multiple stop members may be coupled with (or formed as an integral part of) the leg member 132 to provide convenient access to a user regardless of where they are standing.

Figure 3:
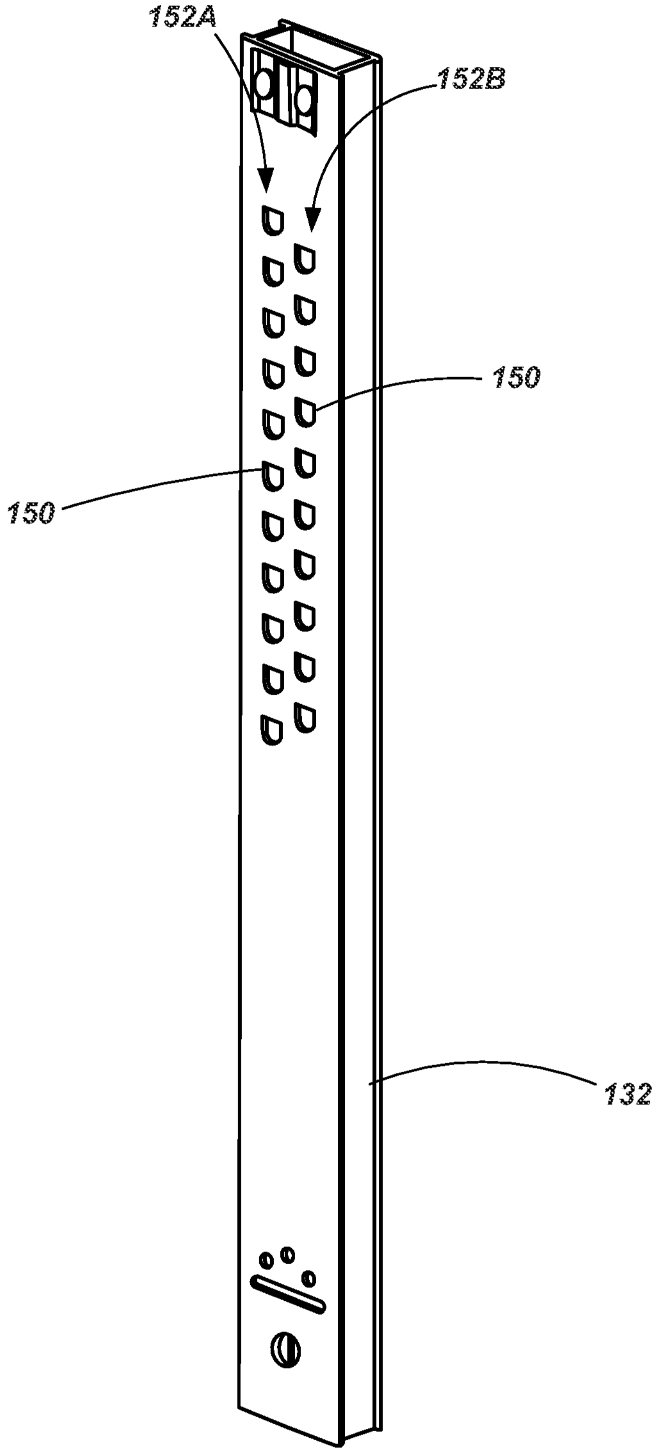
FIG. 3 shows a component of a leveler mechanism according to an embodiment of the present invention.

Referring to FIG. 3 a leg member 132 is shown. The leg member 132 includes a plurality of openings 150 (also referred to herein as engagement surfaces or engagement features) formed along a longitudinal length thereof. In the embodiment shown in FIG. 3, the openings 150 are arranged in two, spaced-apart, substantially parallel, longitudinally-extending columns 152A and 152B. Additionally, in the embodiment shown, the openings of the first column 152A are staggered or offset relative to the openings of the second column 152B. For example, the uppermost opening 150 of the second column 152B is not longitudinally aligned with the uppermost opening 150 of the first column 152A (i.e., they aren't both centered on a common axis that is substantially transverse to the longitudinally-extending axis of either column 152A or 152B).

Rather, the uppermost opening 150 of the second column 152B is positioned at a location that is longitudinally between the uppermost and second uppermost openings 150 of the first column 152A. The remaining openings 150 follow a similar arrangement or pattern. It is noted that, in other embodiments, a different number of columns (e.g., one, three, etc.) may be used if desired. Additionally, in other embodiments, the columns of openings 150 may not necessarily be offset from one another. In some embodiments, a first column of openings may be longitudinally aligned with another column of openings, while remaining staggered (longitudinally unaligned) with yet other columns.

In the embodiment shown in FIG. 3, the openings 150 exhibit a substantially "D" shaped geometry with the flat or linear portion of the D being at the upper portion of the opening. Such a configuration may also be described as having a substantially flat or linear upper surface with a substantially arcuate lower surface. The arcuate surface may be substantially circular (more specifically, semicircular), elliptical or otherwise. Additionally, the arcuate surface may be joined directly to the flat upper surface, or it may be joined with the upper surface by way of additional, intermediate surfaces. The intermediate surfaces may be either flat or arcuate. In other embodiments, the openings may exhibit other shapes including, for example, substantially circular, elliptical, oval or polygonal.

The leg member 132 is sized and configured to be slidably disposed within the channel defined by the rail 108 of the outer assembly 102B. The leg member 132 may be various lengths, and have a various number of openings 150 formed therein depending, for example, on the amount of adjustment that is desired to be obtained from the leveler mechanism 130. In one particular embodiment, the leg may be configured to provide up to approximately 8½ inches of adjustment on each side of the outer assembly 102B. Of course, the leveler mechanism 130 may be configured to provide more or less adjustability if desired and depending, for example, on the size of the ladder or the type of ladder (e.g., combination, extension, step, etc.). The leg 132 may further include additional openings, abutments or features for integration or coupling with other components. For example, openings or slots may be formed for coupling with the foot 144 or the stop member 146 or with other components described herein. In one embodiment, the leg 132 may be formed of a material comprising aluminum or an aluminum alloy. Aluminum provides a relatively high strength to weight ratio that may be desirable in such a component. However, other materials may be used as will be appreciated by those of ordinary skill in the art.

Figure 4:
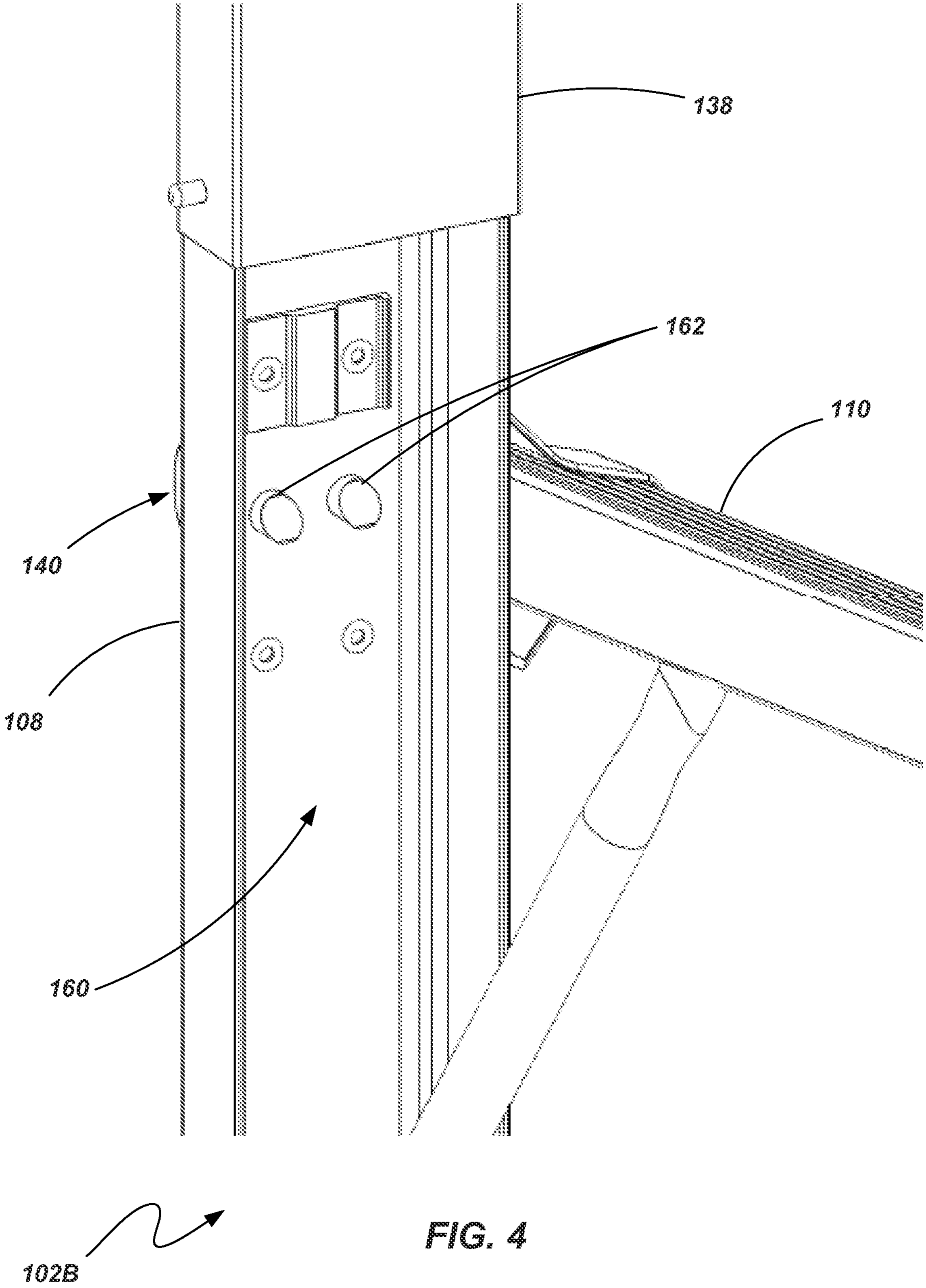
FIG. 4 shows a portion of the ladder depicted in FIG. 1, including certain components of a leveler mechanism according to an embodiment of the present invention.
Figure 5A:
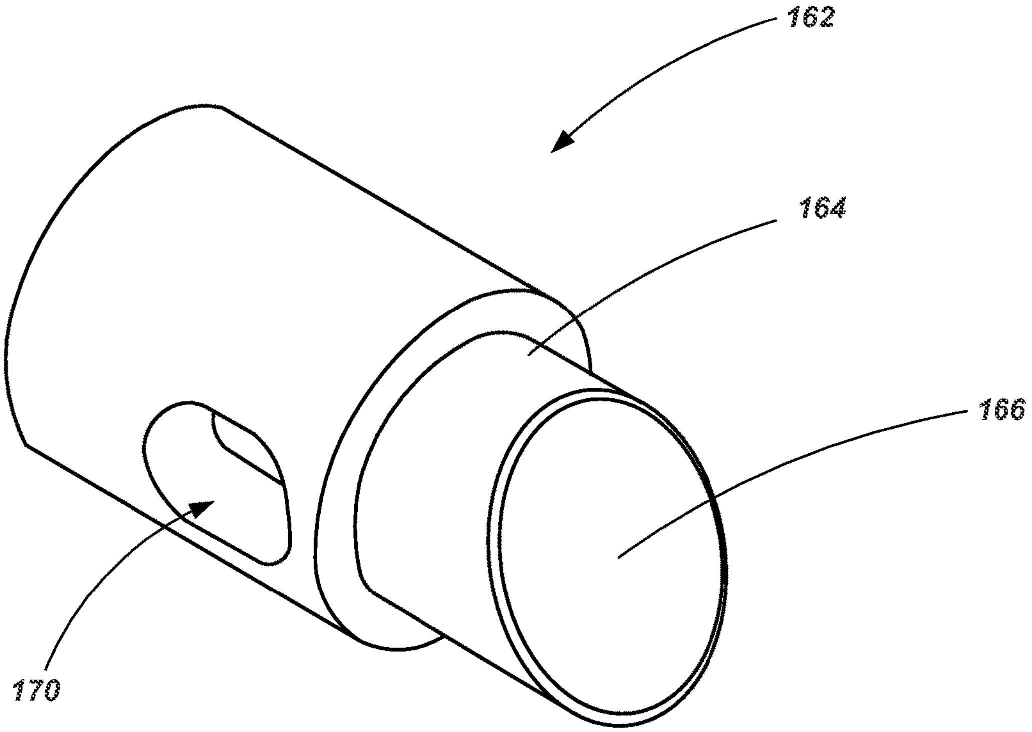
FIGS. 5A and 5B show perspective and cross-section views, respectively, of a component of a leveler mechanism according to an embodiment of the present invention.
Figure 5B:
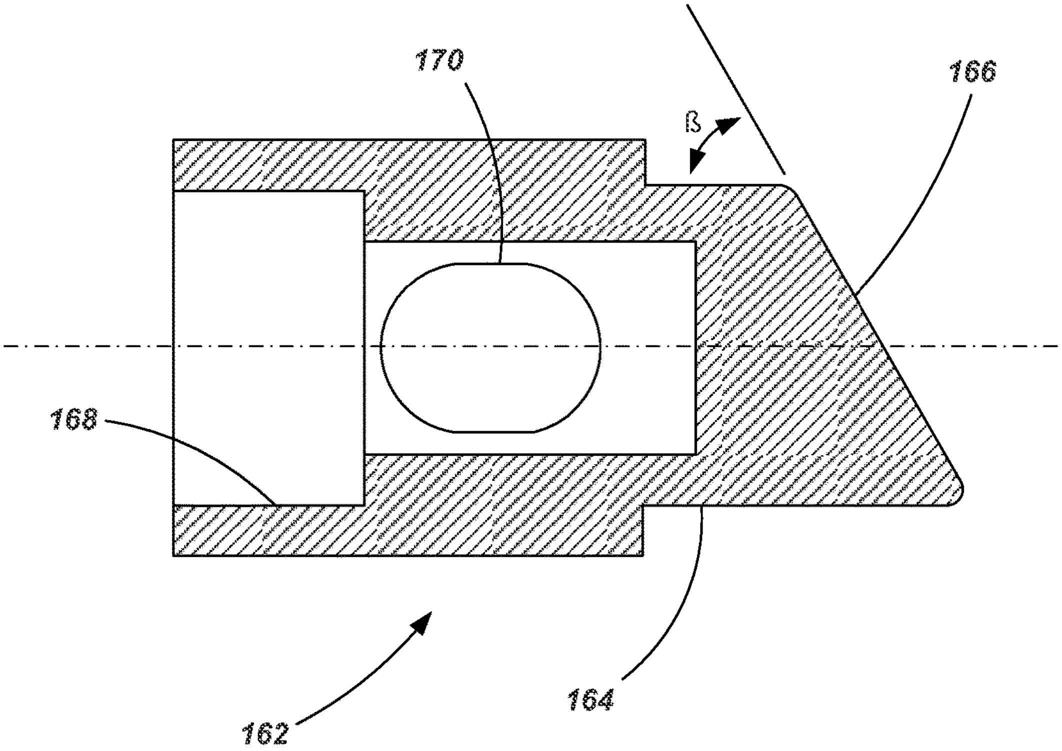

Referring to FIG. 4, an interior view of a portion of the outer assembly 102B is shown with the leg member 132 removed in order to show and describe additional components. With the leg member 132 removed, the longitudinal channel 160, or the space defined by the rail 108 may be more easily seen. Engagement pins 162 associated with the actuating mechanism 140 extend through a portion of the rail 108 and are laterally spaced to align with the columns 152A and 152B of openings 150 (see FIG. 3) formed in the leg member 132. It is noted that the engagement pins 160 are not offset in the same manner as the openings 150 of the leg member 132. Rather, while spaced apart from one another to correlate with the lateral position of the columns 152A and 152B, the engagement pins are located at the same general longitudinal position along the length of the rail 108. Referring briefly to FIGS. 5A and 5B in conjunction with FIG. 4, the engagement pins 162 may exhibit a substantially cylindrical body 164 having an angled engagement surface 166 that protrudes through the rail 108 and into the channel 162. In one particular embodiment, the engagement surface 166 is at an angle 11 of approximately 60° relative to the axis 167 of the cylindrical body 164. The engagement pin 162 may further include a first opening 168 formed in a surface at the opposite end of the engagement surface 164 and a second opening 170 extending into the body from a side surface. The first opening 168 may be a blind opening (or a stepped blind opening as shown) sized and configured for receipt of a portion of a biasing element (e.g., a coil spring, an elastomer body, Bellville washers or other structures) as will be discussed below. The second opening 170 may be a through hole configured to receive a portion of the pull ring 142. In one embodiment, such as shown, the second opening 170 may be formed as a hole or an elongated slot. Such a configuration enables the two (or more) engagement pins 162 to be displaced, relative to the rail 108, independent of one another when moving the leg member 132 from a retracted to an extended state (as discussed below) while enabling both pins to be displaced concurrently by the pull ring 142 in order to move the leg member 132 from an extended to a retracted state. While a specific example of the engagement pin 162 is shown in FIGS. 5A and 5B, other configurations may be utilized. For example, an engagement pin may be configured without a slanted engagement surface. In such an embodiment, the engagement pin may serve as a positive lock in both directions of movement for the leg member 132 and may require the use of an actuation mechanism to enable movement of the leg member 132 in either upward or downward movement.

Figure 6A:
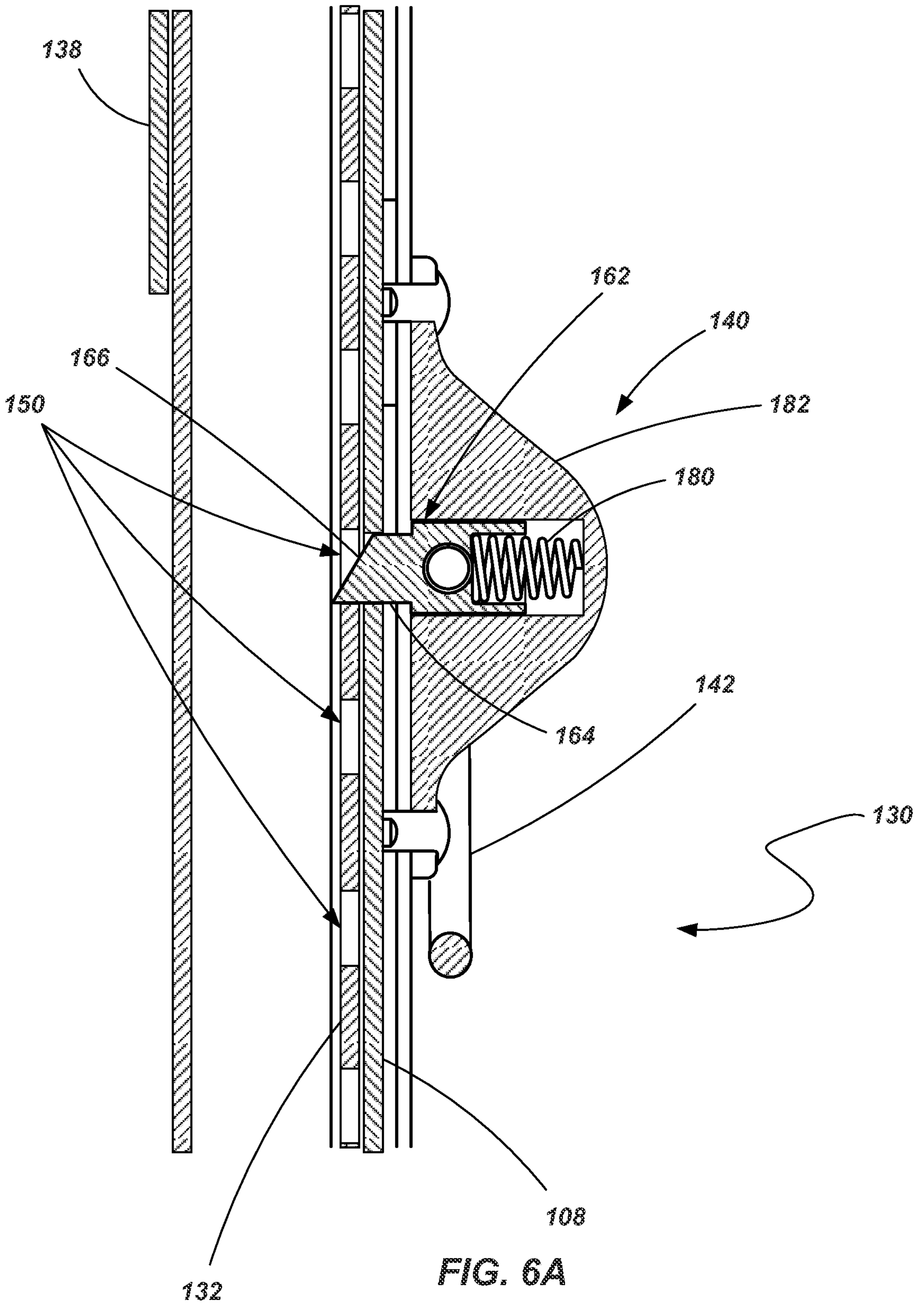
FIGS. 6A-6D are partial cross-section views of a portion of a leveler mechanism during different states of operation according to an embodiment of the present invention.
Figure 6B:
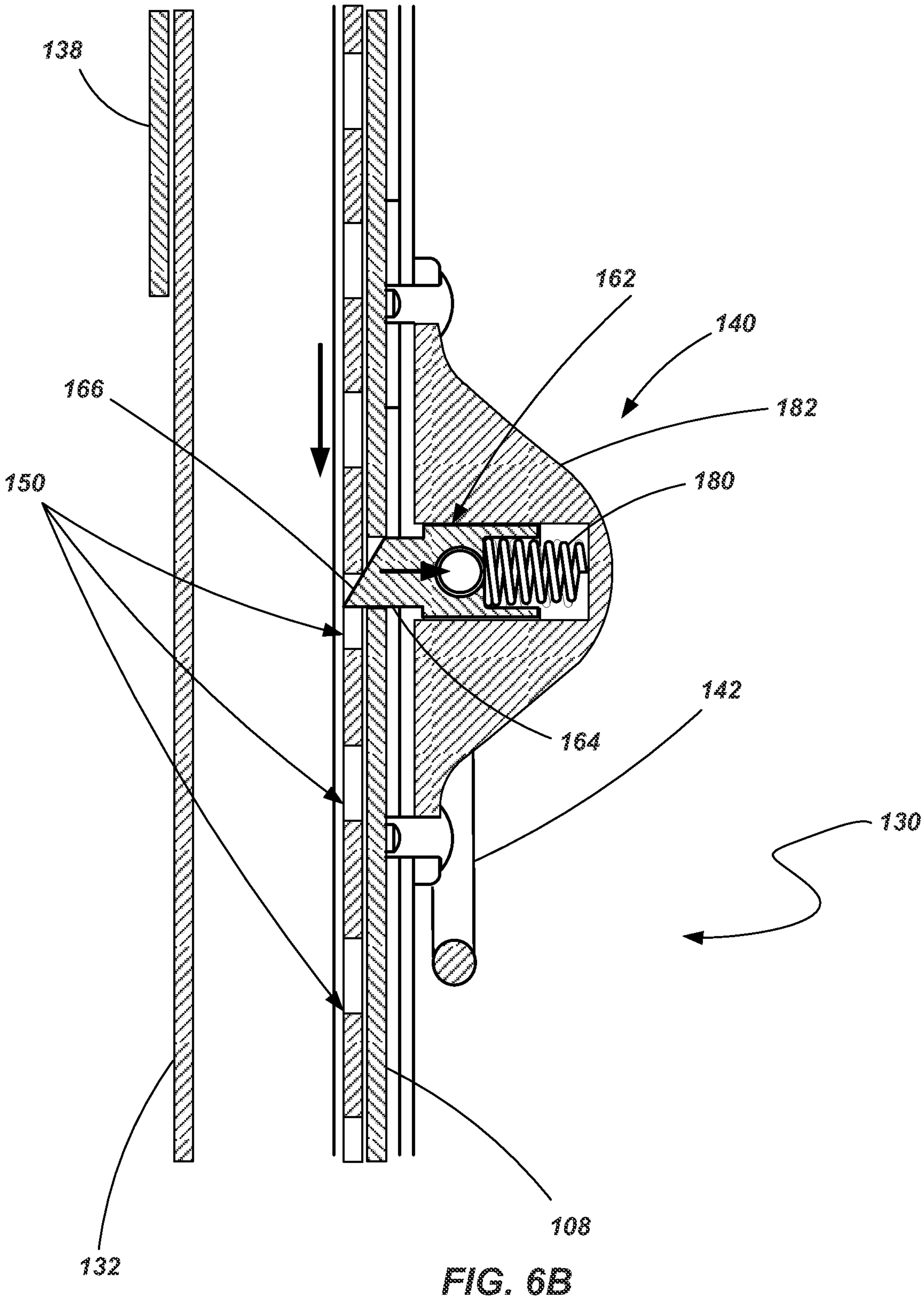

Referring to FIGS. 6A-6D, operation of an actuating mechanism 140 is shown according to one example. FIG. 6A shows the leg member 132 disposed within the channel of the rail 108. An engagement pin 162 of the actuating mechanism extends through an opening in the rail 108 and into one of the openings 150 of the leg member 132. When in this state, the lower arcuate surface of the opening 150 engages with a portion of the engagement pin 162 (e.g., with the cylindrical body 164) in a substantially mating manner and prevents the leg member from moving upward relative to the rail 108 ("upward" and "downward" being relative terms based on the orientation shown in FIGS. 6A-6D). This arrangement provides a positive lock to the position of the leg member 132 (in contrast to some prior art mechanisms that simply rely on friction) preventing it from moving upwards relative to the rail 108. However, if it is desired to adjust the leg member 132 downward relative to the rail 108 (e.g., to compensate for an uneven or sloping supporting surface), a minimal force may be applied to the leg member 132 by a user, such as by pushing downwards on the stop member 146 (FIGS. 2A and 2B) with their foot. When such a downward force is applied to the leg member 132, the upper surface of the opening 150 contacts and applies a force to the engagement surface 166 of the engagement pin 162, causing the engagement pin 162 to overcome the force applied by a biasing element 180 and become displaced within the body 182 of the actuating mechanism 140 such as shown in FIG. 6B. This enables the leg member to be displaced downwardly in a hands-free manner without a user having to grab the leg member with their hands and without having to affirmatively activate any actuating mechanism (e.g., 140) with their hands. Instead, a user can hold the ladder 100 in a steady, level position while they push the leg member 132 downward with their foot until it contacts the supporting surface. As the leg member 132 is displaced downwardly, the engagement pins 162 are continually engaging and disengaging associated openings 150 in the leg member such that a positive stop is continually provided at specified increments.

It is noted that in FIGS. 6A-6D only a single engagement pin 162 is shown and that only a single column of openings is depicted. However, in operation, the second engagement pin 162 (see FIG. 4) alternately engages with its associated column of openings. During operation of the leveler mechanism 130, due to the offset configuration of the columns of openings 150 in the leg member 132 (and the aligned arrangement of the engagement pins 162), only a single engagement pin 162 is ever extended through an opening 150 at a given time. Such an arrangement provides increased adjustability. Using additional rows of openings (e.g., three or four) with a corresponding number of aligned engagement pins could be employed for either greater strength and security (e.g., 2 of 4 pins being concurrently engaged with associated openings) or to provide a finer increment of adjustability (such as by adjusting the staggered spacing of parallel columns of openings, while still having only one pin engage an opening at a time). In one example embodiment, using two columns of openings and two engagement pins, the offset arrangement of the openings provides for adjustment of the leg member 132 in approximately ¼ inch to ⅜ inch increments, although the increments of adjustment may be configured in a greater or lesser magnitude if desired.

Figure 6C:
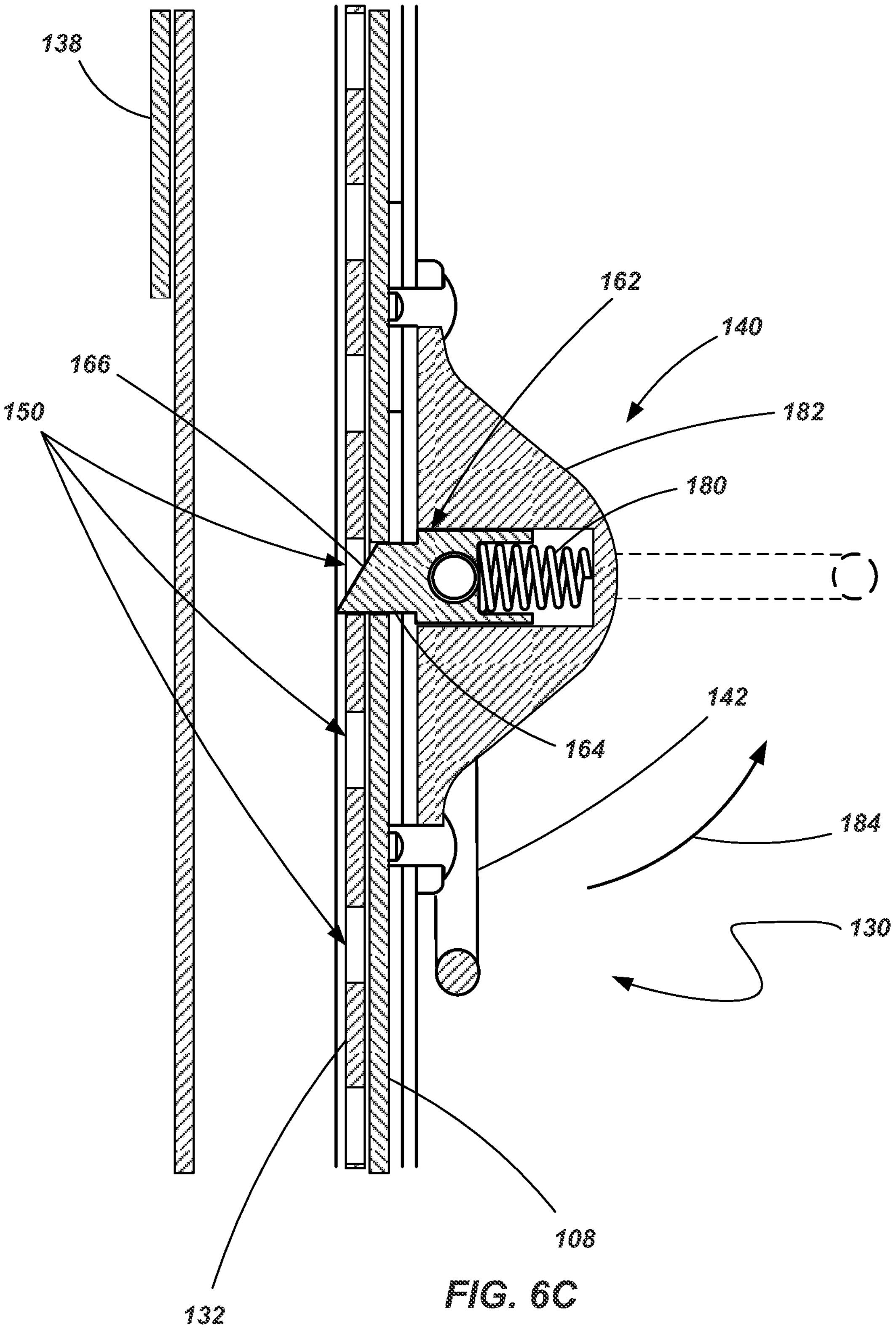
Figure 6D:
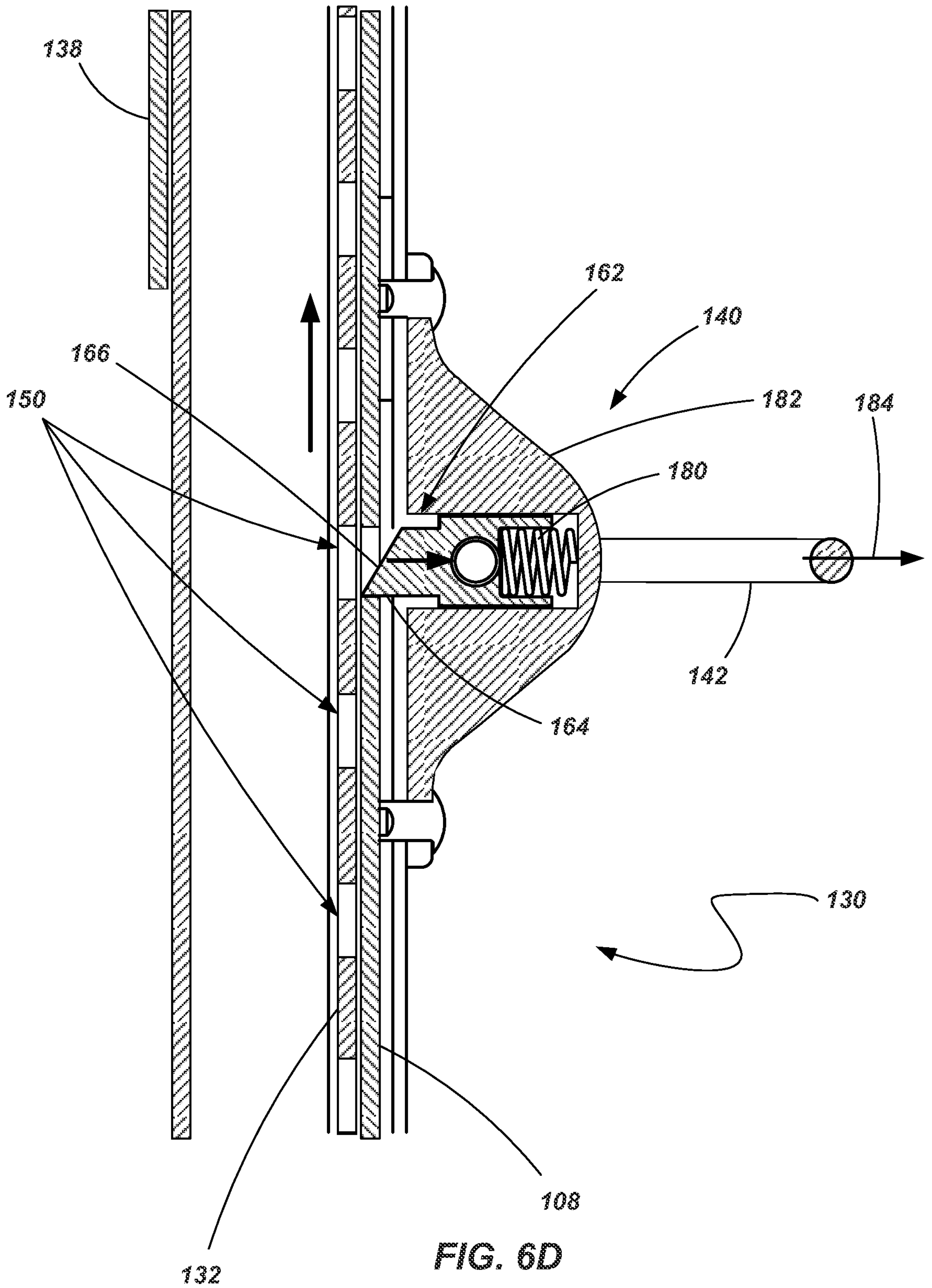

Referring more particularly to FIGS. 6C and 6D, operation of the actuation mechanism 140 is shown which results in the release of the leg member 132 enabling it to slide upwards relative to rail 108. As seen in FIG. 6C, with the engagement pin 162 extending through an associated opening 150 in the leg member 132, the pull ring 142 may be rotated upward from its natural position (hanging from the body 182) such that it extends substantially laterally outward from the rail 108 as indicated by directional arrow 184 and dashed lines. When in the rotated position, a user may pull the pull ring 142 generally outward from the rail 108 (i.e., as indicated by directional arrow 186 in FIG. 6D). When the pull ring 142 is displaced outwardly from the rail 108 with sufficient force to overcome the force of the biasing elements 180, the engagement pins 162 are retracted within the body 182 and out of the opening 150 so that the leg member 132 may be displaced upward relative to the rail 108. It is noted that the leg member 132 may be displaced either upward or downward relative to the rail when the pull ring 142 is pulled outwardly. However, the leg member 132 may only move downward relative to the rail 108 if the engagement pins 162 have not been retracted within the body 182 by affirmative application of force to the pull ring. In this way, the actuation mechanism 140 acts as a one-way limiter—enabling movement of the leg member 132 downward relative to the rail 108 while inhibiting upward relative movement until actuation by a user.

While a specific actuating mechanism has been shown and described, it is noted that other mechanisms may be employed if desired. For example, a mechanism similar to the locking mechanisms 112 and 124 may be used if desired or other embodiments, such as described below, may be used. Additionally, other components may be used in the mechanism. For example, a lever or cammed mechanism may be used in place of the pull ring if desired. However, it is noted that use of the pull ring requires affirmative action (rotating and outward displacement) to effect actuation and helps to prevent inadvertent actuation such as by a falling tool or from a bump by user's foot or leg. Further, while described as being positioned on the laterally outer portion of the rail 108, the actuating mechanism (including the body 182, pull ring 142, etc.) may be positioned at a laterally inward location of the rail 108 and leg member 132 or at some other location if desired. Placing the actuating mechanism 140 "inside" the rail 108 or at some other location may provide additional protection from an inadvertent displacement of the engagement pins 162.

Figure 7A:
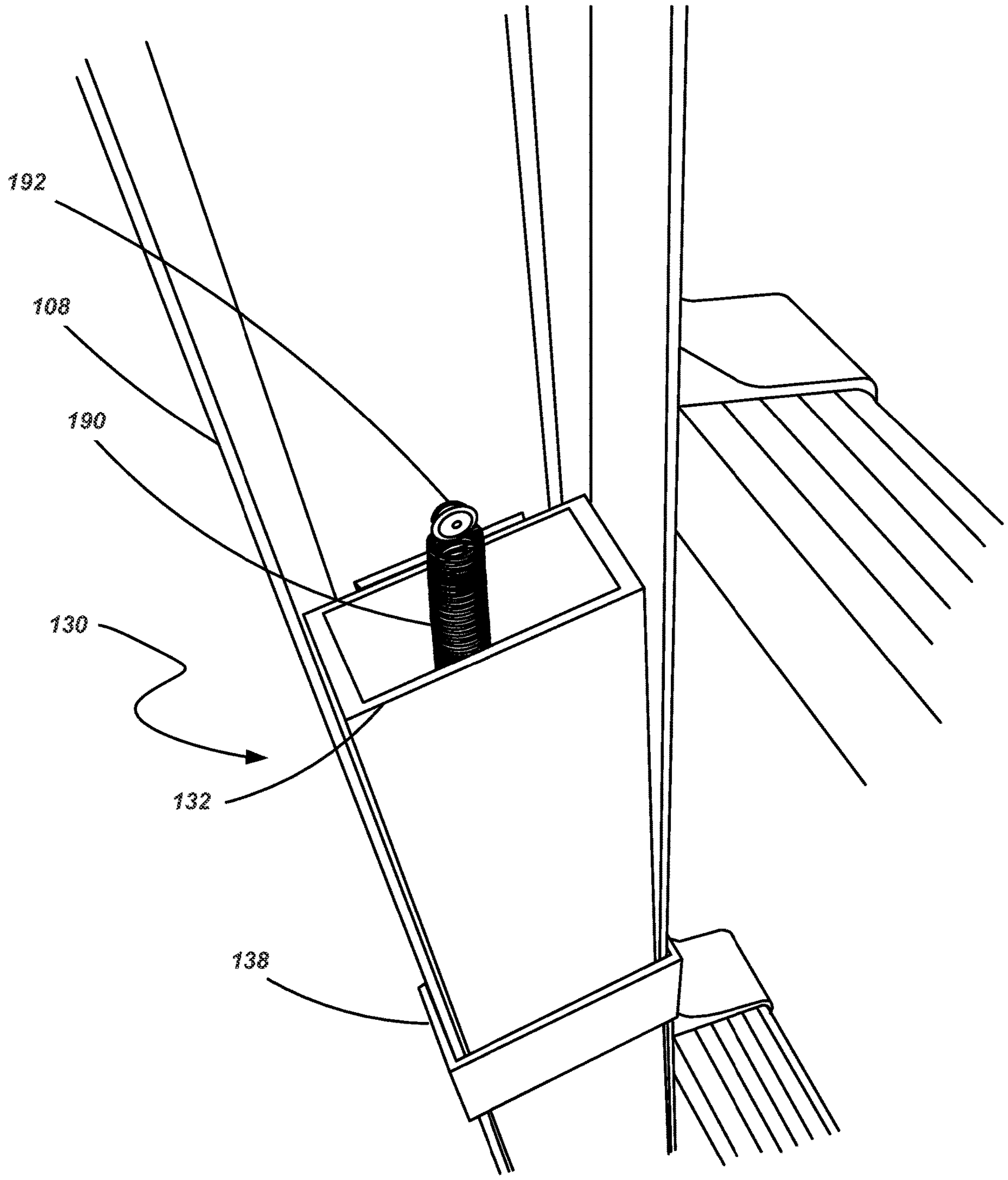
FIGS. 7A and 7B are perspective views of certain components associated with a leveler mechanism while in different states.
Figure 7B:
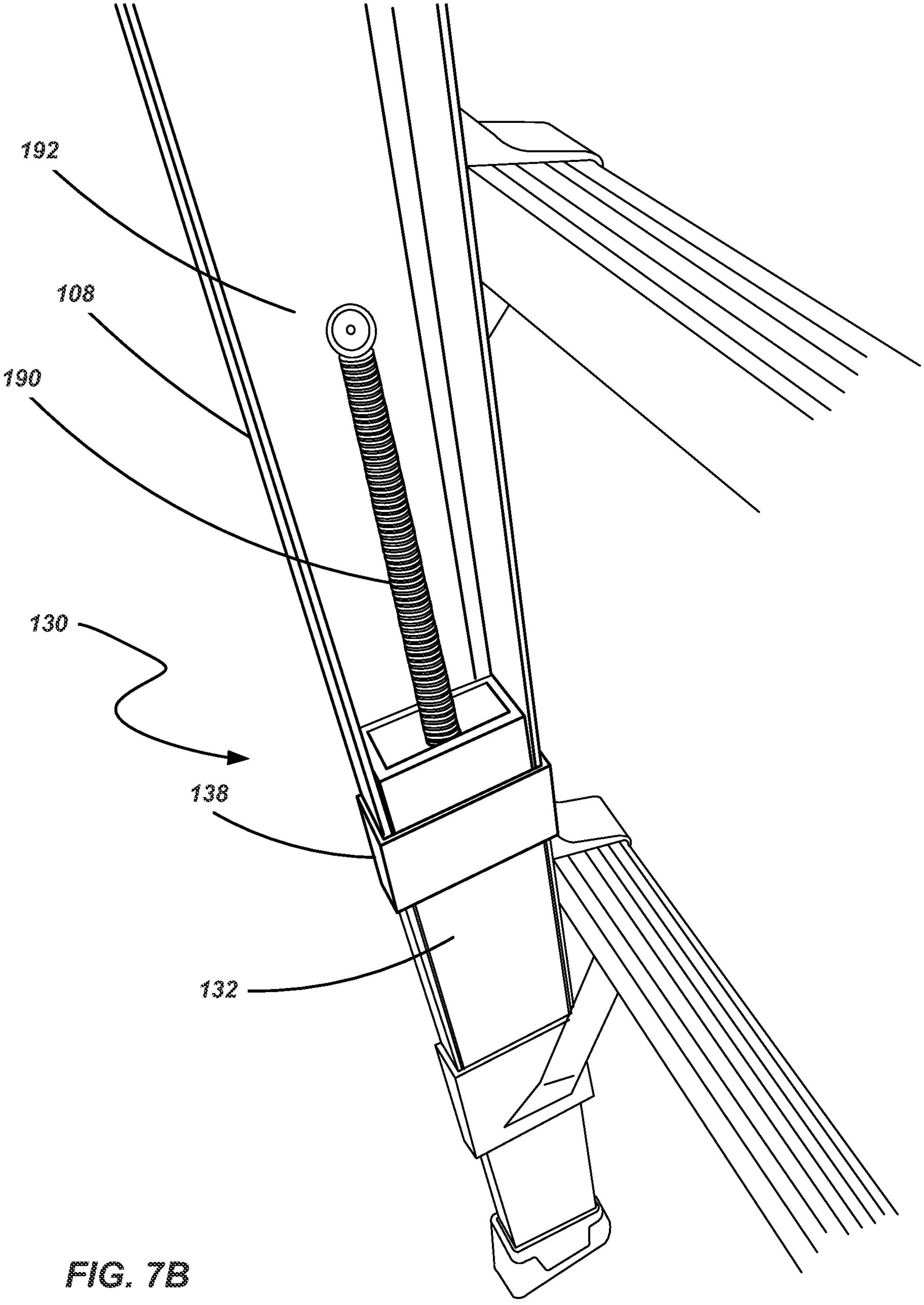

Referring now to FIGS. 7A and 7B, a spring 190 or other biased retaining member may be coupled between the rail 108 and the leg member 132. For example, the spring member 190 may include a coiled spring having a first end coupled with the rail 108 and a second end coupled with the leg member 132. At least a portion of the spring member 190 may be disposed within the channel defined by the rail 108. Additionally, at least a portion of the spring member 190 may be disposed within an opening or channel defined by the leg member 132. For example, as seen in FIGS. 3, 7A and 7B, the leg member 132 may be configured generally as a box member defining a longitudinal channel extending therethrough. In other embodiments, the leg member 132 may be configured as a C-channel or as an H-beam/I-beam component.

The spring member 190 is configured to automatically retract (or at least assist in the retraction of) the leg member 132 from an extended position (e.g., FIGS. 2B and 7B) to a retracted position (e.g., FIGS. 2A and 7A) whenever the engagement pins 162 are retracted within the body 182 of the actuating mechanism 140 by action of pulling the pull ring 142. Additionally, the spring member 190 retains the leg member 132, keeping it from falling downward through the channel defined by the rail 108 when the foot 144 of the leg member 132 is not in contact with a supporting surface. When displacing the leg member 132 from a retracted position to an extended position, a user merely needs to apply a minimal force (e.g., such as with their foot downward against the stop member 146) to overcome the force applied by the spring member 190 and simultaneously cause the upper surface of a given opening 150 to contact the engagement surface 166 and displace an associated engagement pin 162 into the body 182 as described above.

Another stop member 192 may be coupled to the rail 108 and act to limit the upward travel of the leg member 132 when the spring member 190 pulls on the leg member 132 to position it in a retracted state. In one embodiment, the stop member 192 may be formed of a material such as plastic or rubber, although it may be formed of other materials including metals and metal alloys. When the leg member 132 is in a retracted position (e.g., FIGS. 2A and 7A), several surfaces may abut one another to maintain the leg member 132 in such a state. For example, in addition to the upper surface of the leg member 132 contacting the stop member 192, an opening 150 may be engaged with the engagement pin 162 as described hereinabove. Additionally, the stop member 146 coupled with the leg member 132 may engage a lower surface of the associated rail 108 as discussed above (see, e.g., FIG. 2A). Thus, multiple points of positive contact may be used to limit the upward travel of the leg member 132 within the rail 108.

Referring to FIGS. 8A-8E, another embodiment of an actuating mechanism 200 for use with the leveler mechanism 130 is shown (e.g., the actuating mechanism 200 may be used with the leveler mechanism 130 in place of the previously described actuating mechanism 140). The actuating mechanism 200 includes a body 202 a plurality of engagement pins 204. Each engagement pin 204 includes an angled face, or engagement surface 206, as well as an abutment surface 208 along a lower portion thereof. In one embodiment, the engagement pins 204 may be configured substantially similar to the engagement pins 162 described hereinabove. In another embodiment, the engagement pins may be configured as substantially flat dogs, wherein their depth (i.e., the dimension extending into the plane of the drawing) is substantially less than their height or width (i.e., the dimensions extending up and down, and left to right, respectively as seen in the drawings). Such a configuration may enable the engagement pins 204 to be manufactured, for example, by stamping or cutting them from a relatively thin sheet of material (e.g., metal or metal alloy). When the pins 202 are configured as substantially flat members, the corresponding openings 150 in the leg member 132 may be configured as substantially rectangular openings.

Figure 8A:
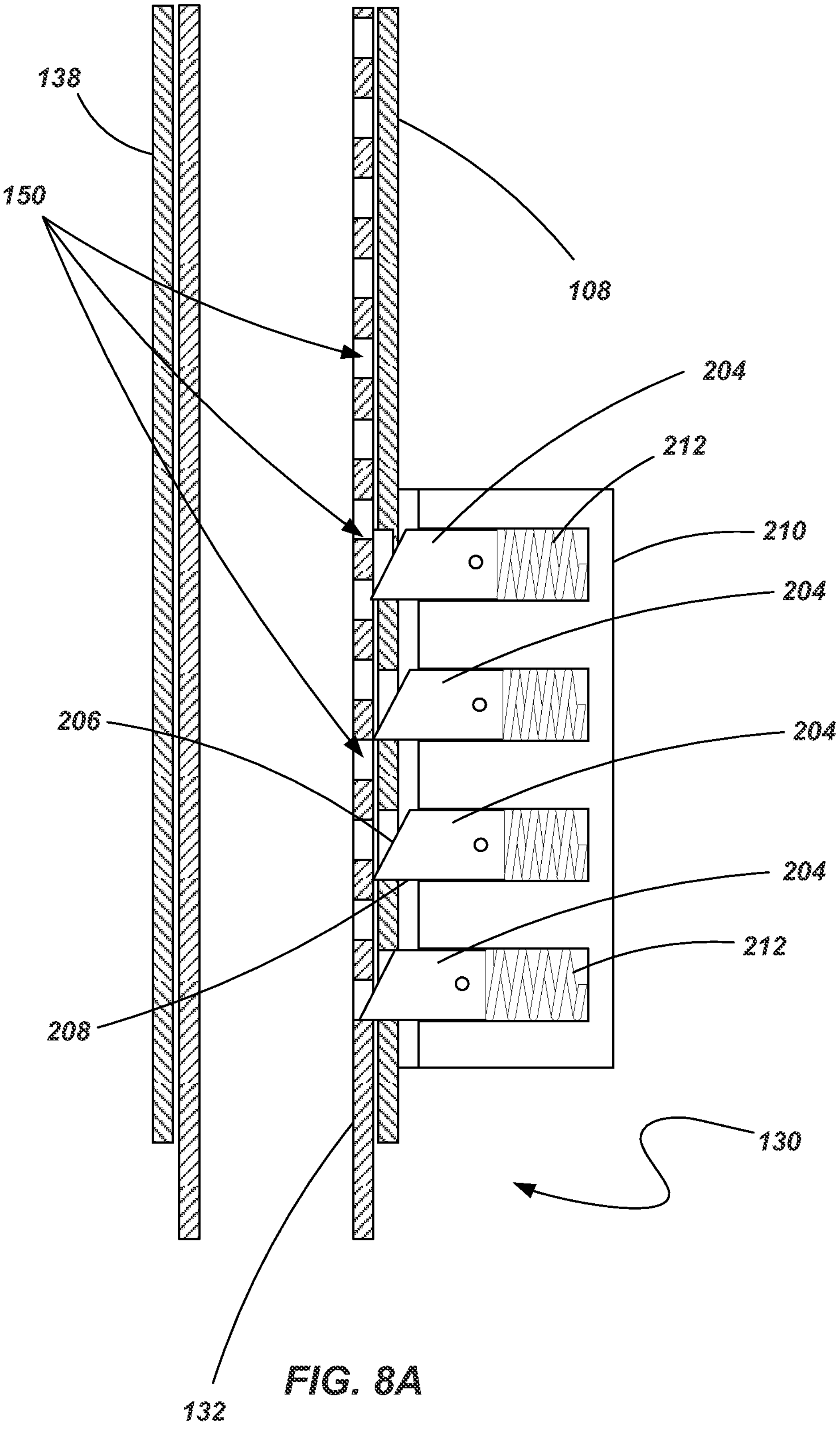
FIGS. 8A-8E are partial cross-section views of a portion of a leveler mechanism during different states of operation according to another embodiment of the present invention.

The engagement pins 204 are positioned within a body 210 and are biased toward the rail 108 and leg member 132 by way of associated springs 212 or other biasing members. In the embodiment shown, there are four engagement pins 204 vertically aligned with respect to each other. The engagement pins 204 each extend through an associated opening in the rail 108 of the outer assembly 102B and are configured to alternately engage one of the plurality of openings 150 formed in the leg member 132. For example, as shown in FIG. 8A, only the lowermost pin 202 is engaged with an opening 150 of the leg member 132. In other words, the lowermost pin 202 has its lower abutment surface 208 in contact with a surface of an associated opening 150. When in this state, the lowermost pin 202 prevents the leg member 132 from moving upwards relative to the rail 108. It is noted that a portion of the upper surface of the lowermost engagement pin 202 is also in contact with the associated opening in the rail 108. This results in a positive lock transferring force from the leg member 132, through the pin 202 and to the rail 108. None of the other pins (i.e., other than the lowermost pin) shown in FIG. 8A are in abutting engagement with a surface of an opening 150 in the leg member 132.

Figure 8B:
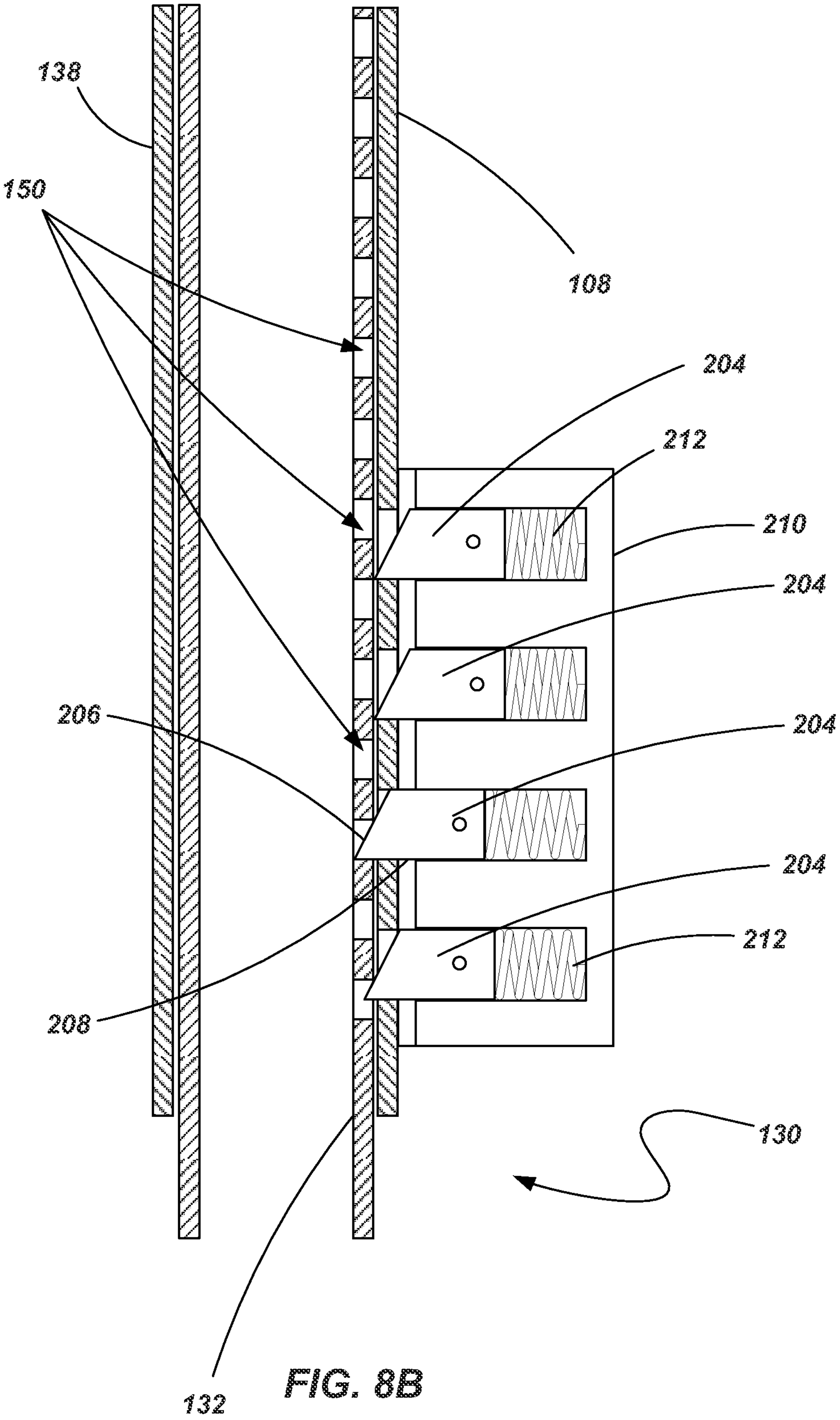
Figure 8C:
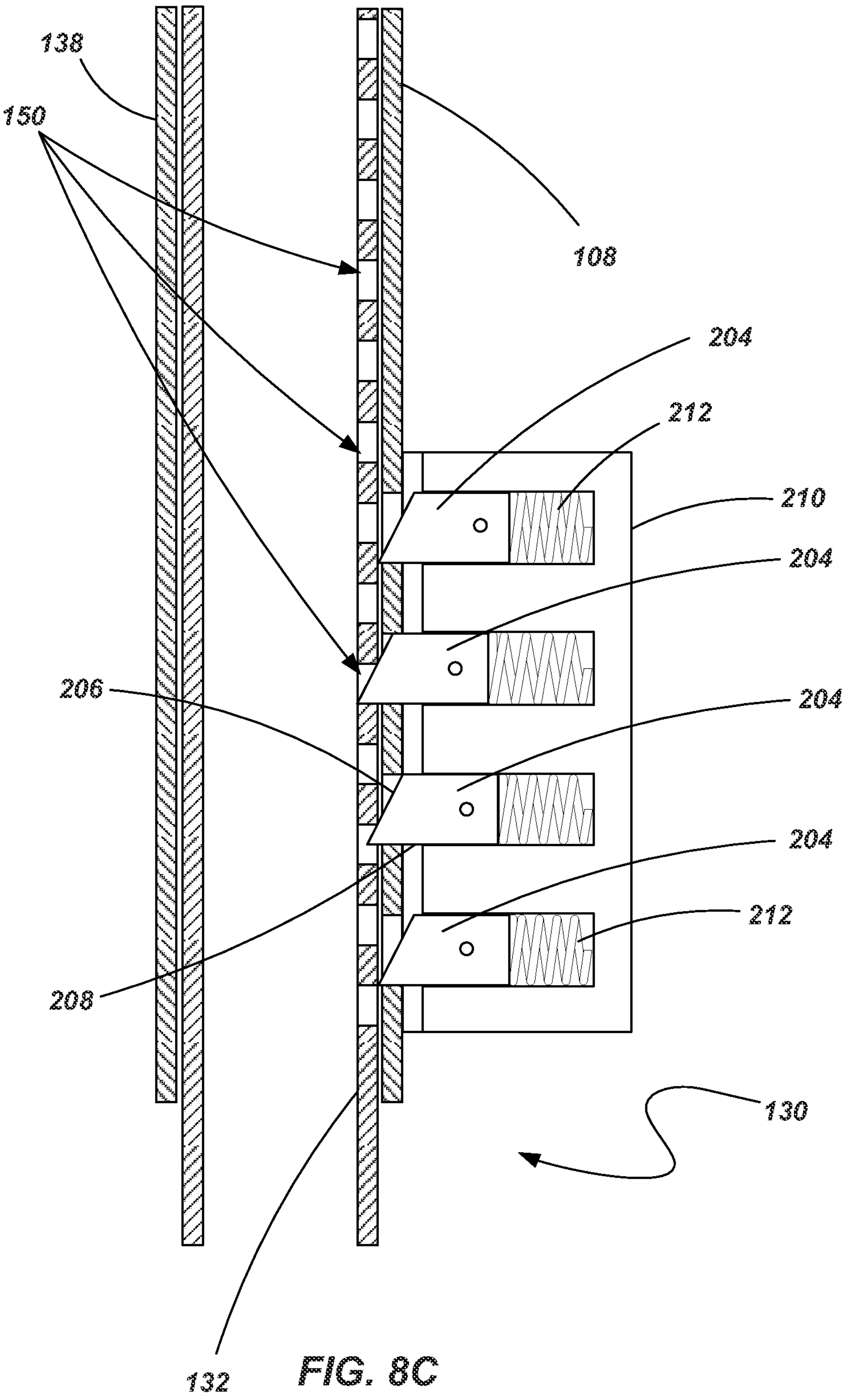
Figure 8D:
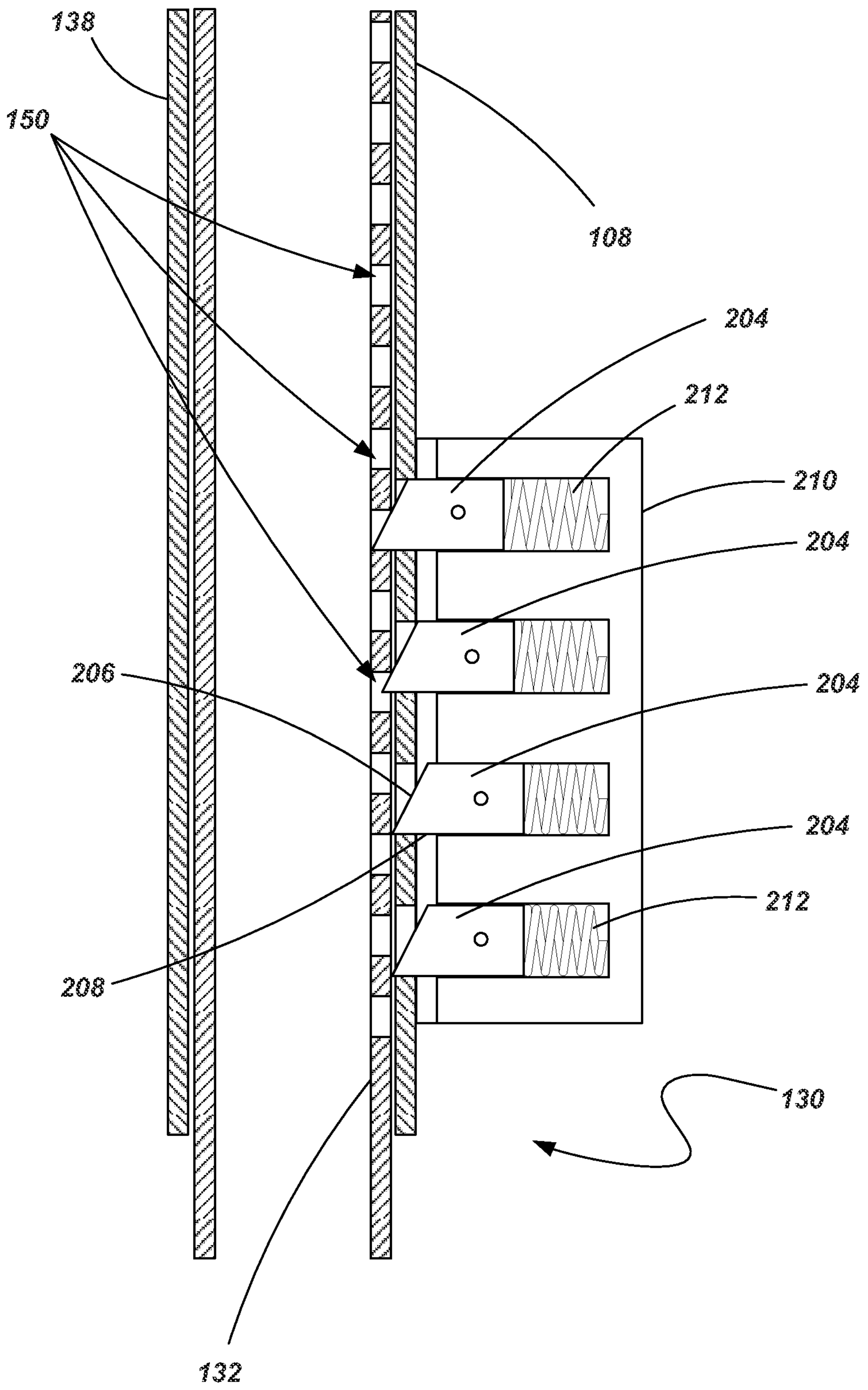

As seen in FIG. 8B, when the leg member 132 is displaced downwardly relative to the rail 108, the upper surface of an opening 150 contacts the engagement surface 206 of the lowermost pin 202 causing it to become displaced outwardly from the leg member 132, into the body 210 and compressing its associated spring 212. As it does so, the second pin from the bottom is displaced toward the leg member 132 into abutting engagement with another opening 150. As shown in FIG. 8B, the pin 202 that is second from the bottom is now the only pin that is in abutting engagement with an opening 150 of the leg member 132. The sequence continues as seen in FIG. 8C where, as the leg member is displaced further down relative to the rail 108, the pin 202 that is third from the bottom is now the only pin 202 to be in abutting engagement with an opening 150 and, again, in FIG. 8D, the uppermost pin 202 becomes the only pin to be in abutting engagement with an opening 150. If the leg member was pushed further downward, the sequence would start over with the lowermost pin becoming engaged with a new opening 150.

Figure 8E:
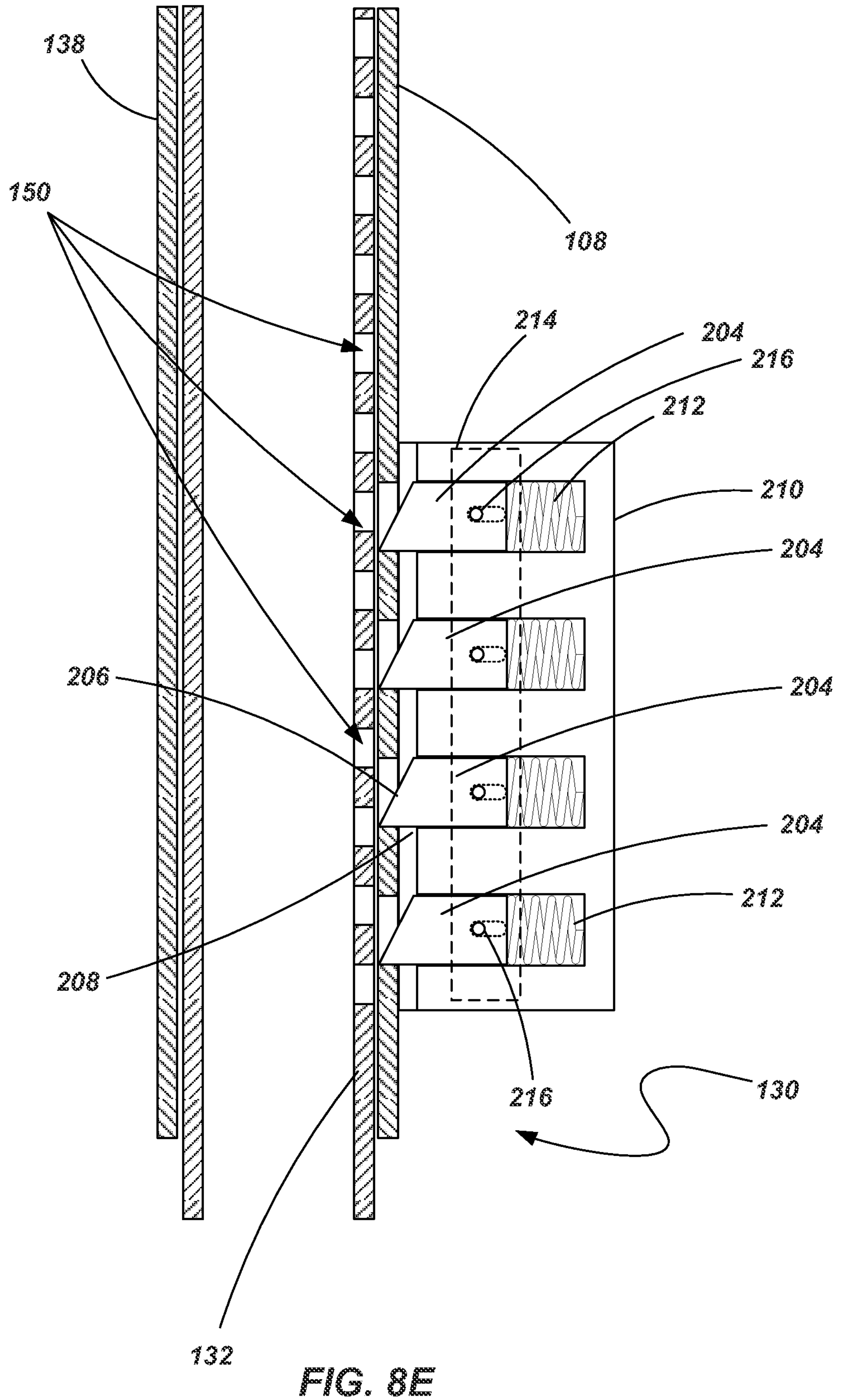

Referring to FIG. 8E, a handle 214 (shown in dashed lines) may be coupled to the engagement pins 202, such as by way of coupling pins 216, and configured to retract all of the pins 202 from the openings 150 simultaneously. Such enables the leg member 132 to move either upward or downward relative to the associated rail 108. This enables the leveler 130 to operate in the same manner as described above. While a handle is shown and described, other mechanisms of retracting the pins 202 within the body may be used including levers, buttons, cammed mechanisms and the like.

In one embodiment, the openings 150 may be sized such that only a portion of an engagement pin may extend therethrough. For example, in one embodiment, each of the pins 202 may exhibit a height of approximately 7/16 of an inch, wherein the openings 150 may each exhibit an overall height of approximately 1/4 of an inch. Additionally, in one particular embodiment, the pins 202 may be spaced approximately 7/8 of an inch (center to center) while the openings are spaced approximately 1/2 of an inch (center to center). Such an arrangement results in an adjustment increment of approximately 1/8 of an inch. In other words, every time the leg member 132 moves downward relative to the rail 108 a distance of 1/8 of an inch, a new engagement pin 202 engages an opening such as described with respect to the sequence depicted in FIGS. 8A-8D.

The embodiments of the leveler mechanism 130 described above provide a variety of advantages. For example, the leveler mechanism is integrated with the ladder and is substantially "self-contained" meaning that it is not an add-on feature or structure that is often cumbersome, awkward and clumsy. Rather, the leveler mechanism is simply an integral part of the ladder. In many add-on style levelers found in the prior art, the position and attachment of such levelers often renders the ladder more susceptible to bumps and inadvertent abuse because the levelers add to the size and bulk of the ladder (typically in a lateral direction from the rails). Such bumps and abuse often result in the bending of the rails such that they "toe-in" and render the ladder less stable.

Additionally, the leveler mechanism of the present invention provides a method of modifying a ladder that is simple and may be accomplished without tools. For example, the outer assembly of an existing ladder that does not include a leveler mechanism may simply be removed from the inner assembly (i.e., by releasing associated locks and sliding the outer assembly off of the inner assembly) and then replaced by positioning a new outer assembly that does include a leveler mechanism (e.g., similar to outer assembly 102B) on the inner assembly and locking it in place with the locks (e.g., 112). Thus, a user needs no tools, but only needs to activate the locks on an existing ladder, remove the existing outer assembly, replace it with a new outer assembly containing the leveler mechanisms, and lock the new outer assembly in place. These actions are similar to the regular operation of the ladder when extending it to a new height. Users will be familiar with this operation and the integrity of the ladder won't be compromised by, for example, drilling attachment holes into existing components or installing new fasteners. In another example, a user could replace the base of an extension ladder or an adjustable step ladder in a similar manner to provide a new base with integrated leveler mechanisms.

It is also noted that when the leg members of the present invention are positioned within rails that are angled or flared outwardly relative to each other, the extension of the leg member provides a widened base when in an extended state, adding to the stability of the ladder, without the need to pivot or articulate the leg member as is typically done with many prior art stabilizers.

While the leveler mechanisms have been described in association with a single rail assembly, it is noted that leveler mechanisms may be associated with either rail assembly, or with both rail assemblies (e.g., 102 and 114) if desired. Additionally, while described using an example of a combination ladder, levelers such as described herein may be used with a variety of ladders including extension ladders and step ladders including, but not limited to, the various ladders described in the patents incorporated by reference herein.

Further, a similar adjustment mechanism may be used to connect any two components of a ladder. Thus, for example, the actuation mechanism and the associated openings described with regard to the leveler mechanism could be used in adjusting the inner and outer assemblies of a ladder. In another embodiment, such an arrangement could be used in coupling a safety rail or other accessory or component to a ladder. In another embodiment, such an arrangement may be used in coupling two different components of a ladder in a man hole.

Figure 9:
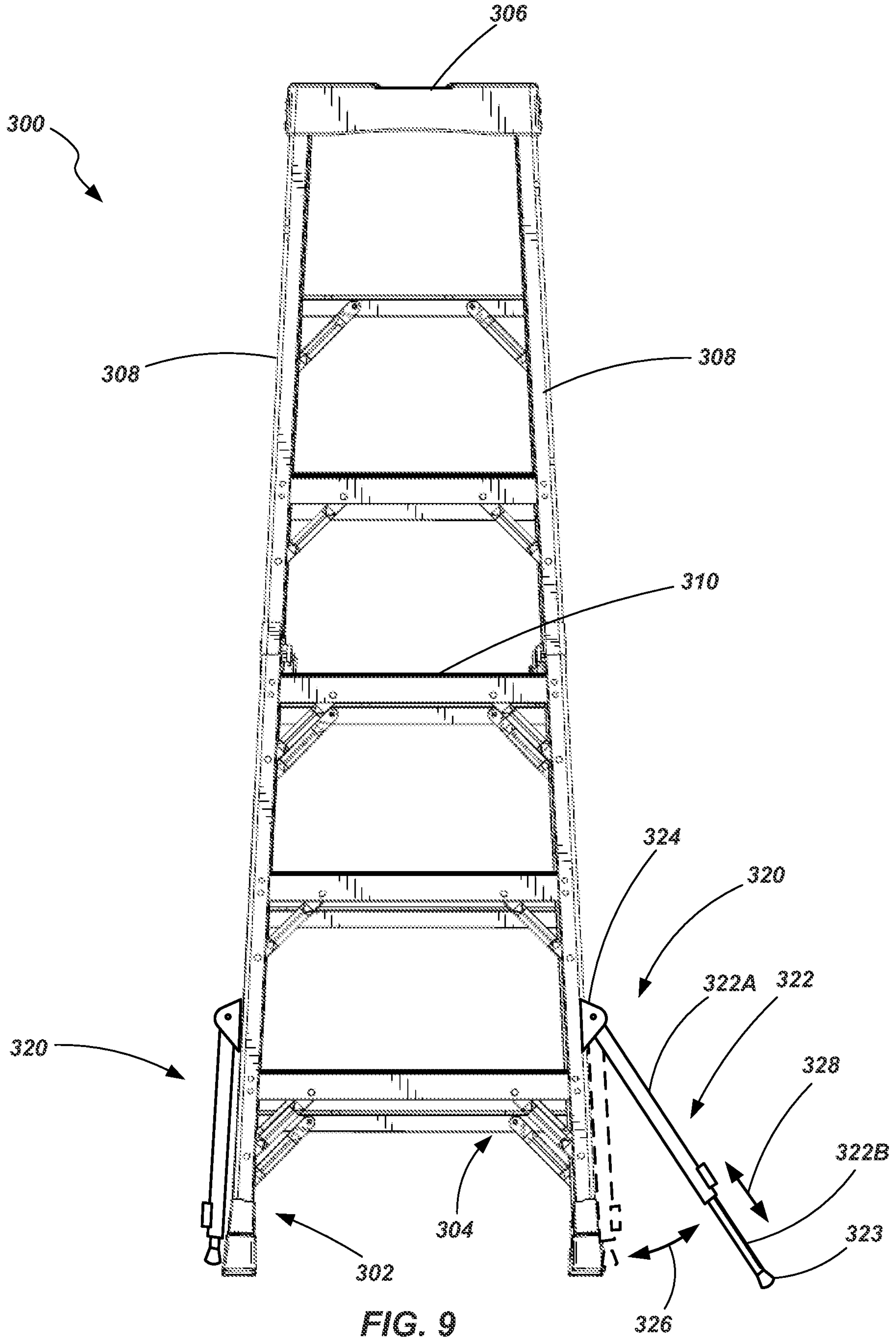
FIG. 9 is a front view of a step ladder and an adjustable stabilizing mechanism in accordance with an embodiment of the invention.

In another example, a stabilizer (sometimes referred to as an outrigger) may be configured to include the actuating mechanisms or other components described herein. For example, referring to FIG. 9, a step ladder 300 is shown. The step ladder includes a first assembly 302 and a second assembly 304 (positioned behind the front assembly in the view shown in FIG. 9), with each assembly 302 and 304 being coupled to a top cap 306. One or both of the assemblies 302 and 304 may pivot relative to the top cap 306 so that the ladder 300 may be collapsed for storage and transportation. The front assembly 302 includes a pair of spaced-apart side rails 308 and a plurality of rungs 310 extending between, and coupled to, the side rails 308. While not clearly shown, the rear assembly 304 may also include a pair of spaced-apart side rails. The second assembly may, or may not include a plurality of rungs. In the case that the second assembly does not include rungs, it may include one or more bracing members or other structural components to provide desired stability and strength to the second assembly.

The ladder 300 also includes stabilizers 320. In one embodiment, a stabilizer 320 may be associated with each of the side rails 308 including an adjustable leg member 322 that is pivotally coupled to side rail 308 such as by way of an associated bracket 324. The leg member 322 may be pivotally positioned between at least two positions (e.g., a stored position, and an extended position) as indicated by directional arrow 326 and by dashed lines. The leg member 322 may be configured to be pivoted generally in a common plane defined by the two side rails 308, or it may be configured to be pivoted out of plane relative to the side rails 308. In one embodiment, the adjustable leg may be pivotable about multiple axes.

The adjustable leg member 322 may include, for example, two (or more) leg components 322A and 322B that are telescopically coupled to one another (e.g., one being inserted within an internal space defined by the other, the two components being slidably displaceable relative to each other as indicated by directional arrow 328) and a foot member 323 coupled to an end of the second leg component 322B. An adjustment mechanism 330 may be associated with the two leg components 322A and 322B to control the adjustment of the leg member 322. For example, the adjustment mechanism described with respect to FIGS. 8A-8E could be used to control adjustment of the leg 322. In such a case, the first leg component 322A might correspond with the "rail 108" and its associated openings as described above, and the second leg component 322B might correspond with the "leg member 132" and its associated openings as described above. The leg components 122A and 122B may be exhibit a variety of geometries. In one example embodiment, the leg components 322A and 322B may be tubular exhibiting, for example, round, elliptical or polygonal cross-sectional geometries.

Figure 10:
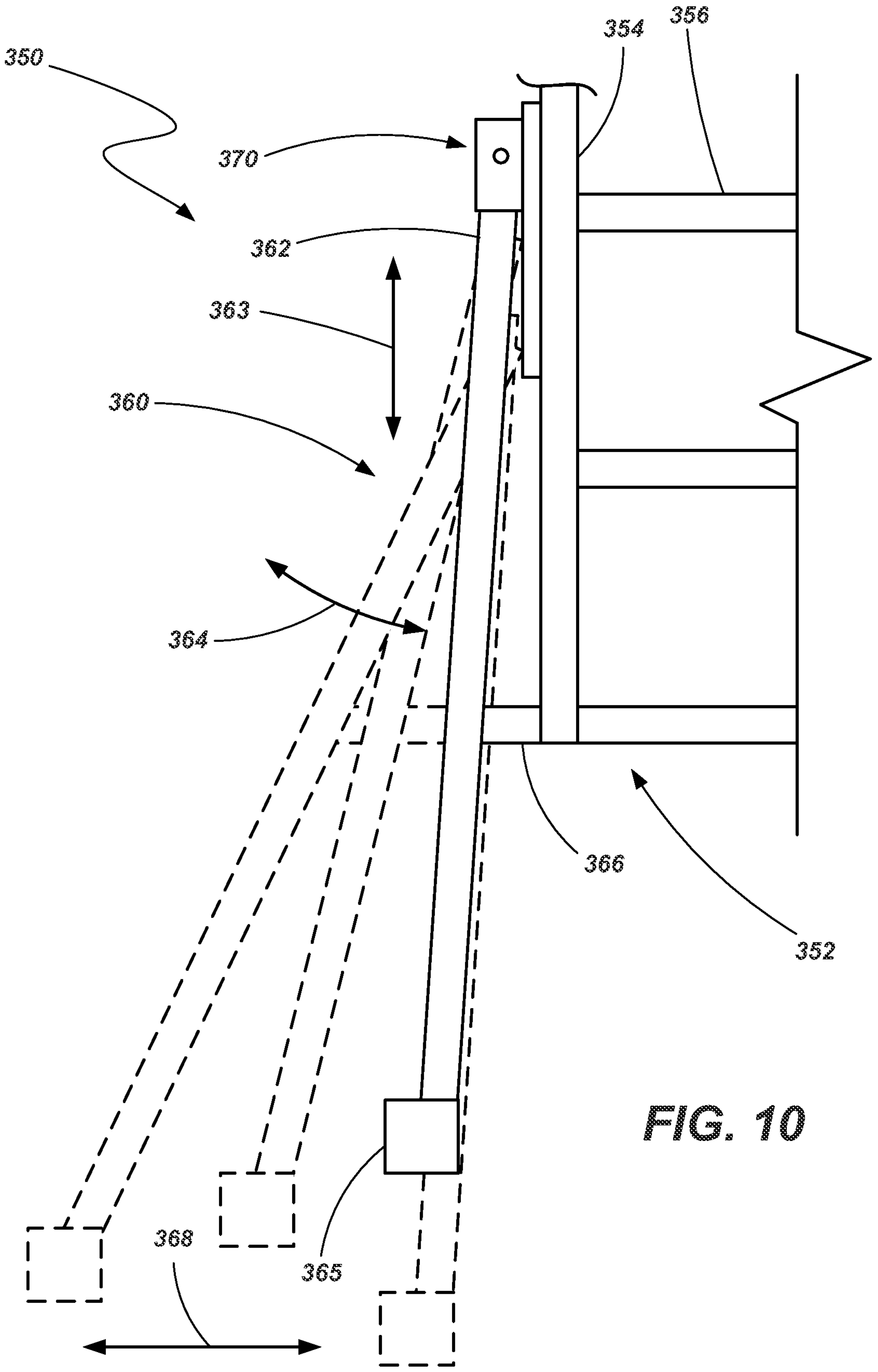
FIG. 10 is a partial front view of a ladder and an adjustable stabilizing mechanism in accordance with another embodiment of the invention.

Referring to FIG. 10, a ladder 350 is shown in accordance with another embodiment of the present invention. The ladder 350 may be configured as an extension ladder and include a base section 352 and a fly section (not shown) slidably coupled with the base section as will be appreciated by those of ordinary skill in the art. The base section 352 includes two spaced apart side rails 354 and a plurality of rungs 356 extending between, and coupled to, the side rails 354. A stabilizer 360 may be associated with each side rail 352 and may include a leg member 362 having a first end pivotally and slidably coupled to the side rail 352 as indicated by directional arrows 363 and 364, respectively. A foot member 365 may be coupled to the second end of the leg member 362 and be configured for engagement with the ground or a supporting surface. In one embodiment, a lateral support member 366 may be slidably displaceable in the direction indicated by directional arrow 368 relative to the side rail 354. The lateral support member 366 may also be slidably and pivotally coupled to the leg member 362. An adjustment mechanism 370 may be associated with the first end of the leg member to enable selective positioning of the first end of the leg member along a selected length of the side rail 354. Examples of an extension ladder including such a stabilizer are set forth in U.S. Pat. No. 8,365,865, issued Feb. 5, 2013, to Moss et al., the disclosure of which is incorporated by reference herein in its entirety. Additional examples of ladders incorporating a stabilizer are set forth in U.S. Patent Application Publication No. 2014/0202793, published Jul. 24, 2014, the disclosure of which is incorporated by reference herein in its entirety.

Figure 11:
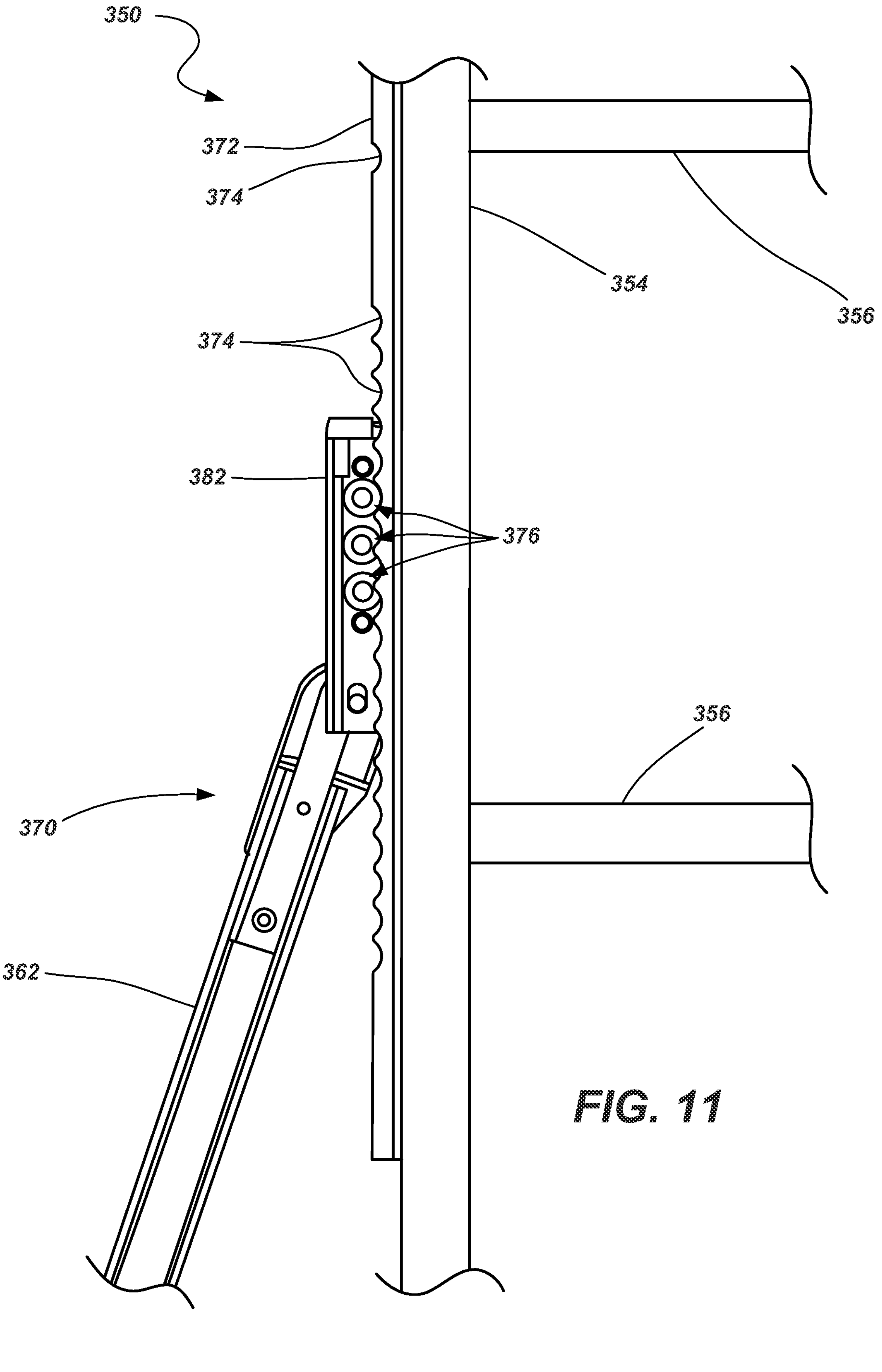
FIG. 11 is a side view of a ladder with a more detailed view of an associated adjustment mechanism.
Figure 12:
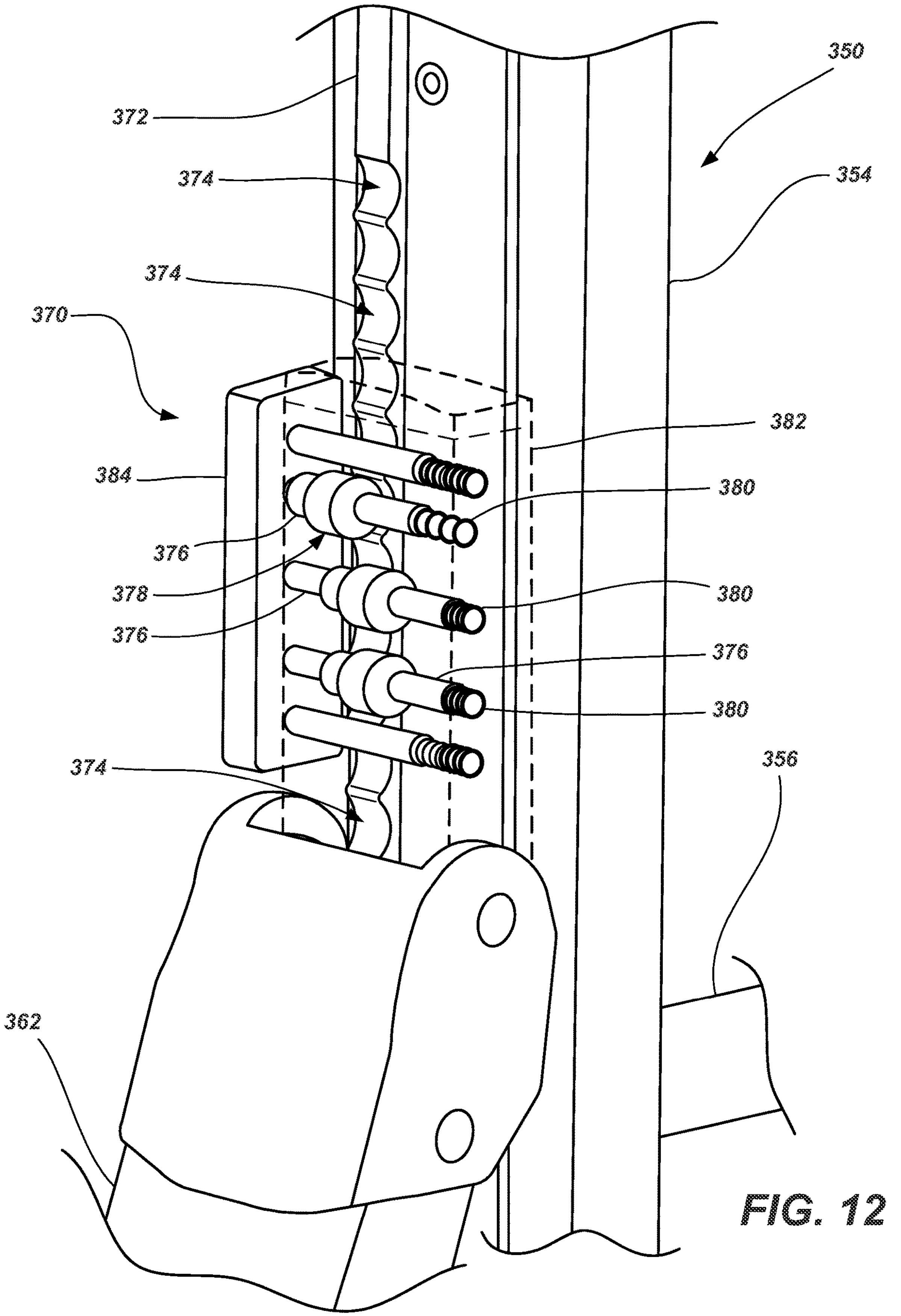
FIG. 12 is a perspective view of the ladder and adjustment mechanism shown in FIG. 11.

Referring to FIGS. 11 and 12, further details of the adjustment mechanism 370 is shown according to one embodiment. The adjustment mechanism 370 includes a first component 372 coupled with the rail 354 of the ladder 350. The first component 372 includes a plurality of engagement surfaces or engagement features formed therein. In one embodiment, the engagement features include a plurality of scallops 374 or concave surface portions arranged in a column extending along a given length of the rail 354. The scallops 374 may exhibit a geometry, for example, of a portion of a cylindrical surface. In other embodiments, the scallops 374 (i.e., the engagement feature) may exhibit some other shape which may, or may not, have a mating or conformal shape as compared to associated engagement pins.

The adjustment mechanism 370 further includes a plurality of engagement pins generally identified by 376 (with specific pins identified as 376A-376C in certain drawings) having a first portion 378 (FIG. 12) configured to substantially matingly engage the scallops 374. In one embodiment, the first portion 378 may exhibit, for example, a substantially cylindrical portion having an enlarged diameter relative to other portions of the pins 376. In other embodiments, the pins 376 (particularly the engaging first portion 378) and the scallops may include engagement surfaces that exhibit a variety of other geometries including arcuate surfaces, polygonal surfaces, slots, channels, holes and, as noted above, the engagement surfaces of the pins may or may not mate (or substantially conform with) the corresponding engagement surfaces of the scallops 376 (or other engagement feature).

Figure 13A:
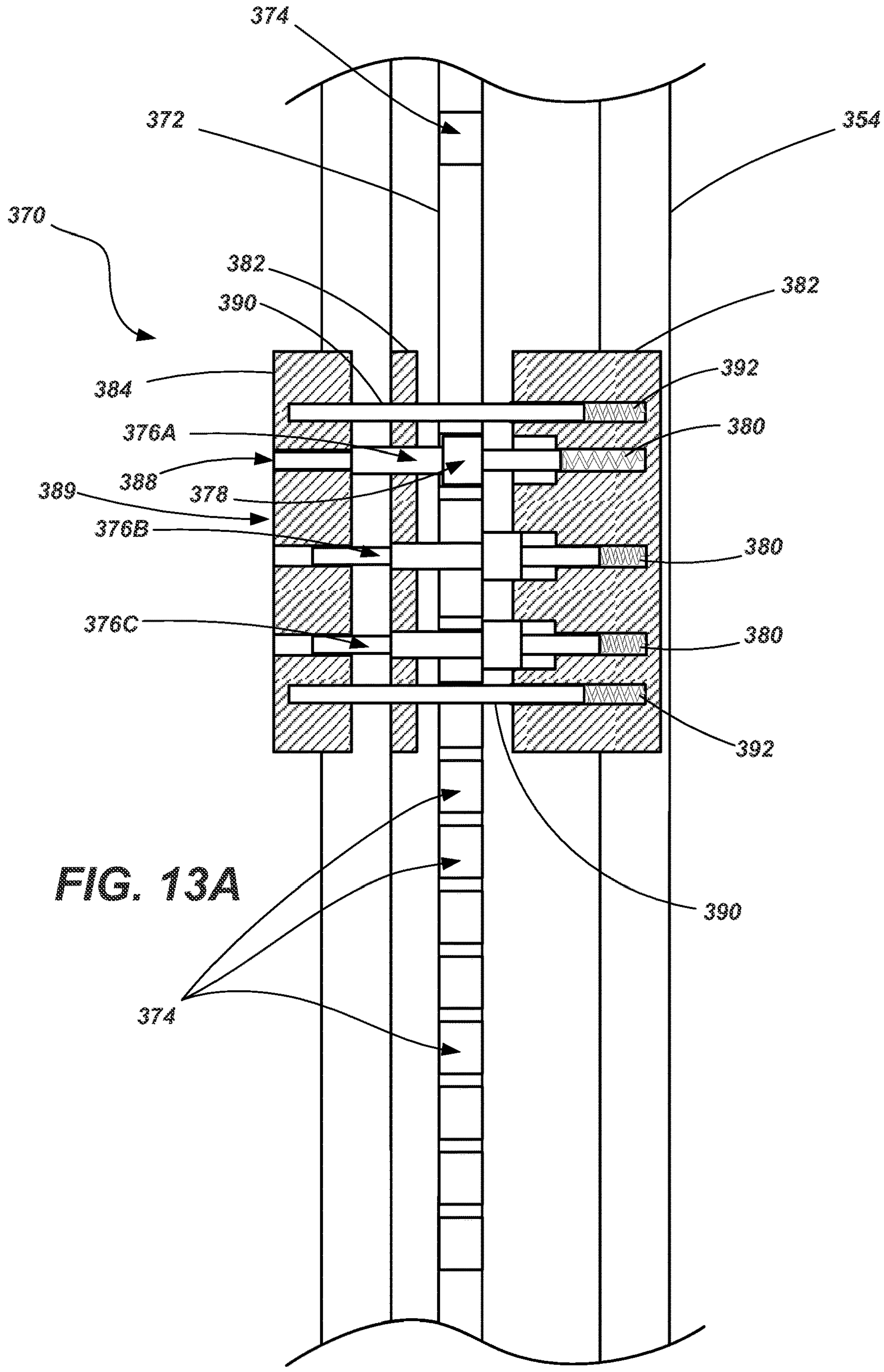
FIGS. 13A-13C are partial cross-sectional views of the adjustment mechanism shown in FIGS. 11 and 12.
Figure 13B:
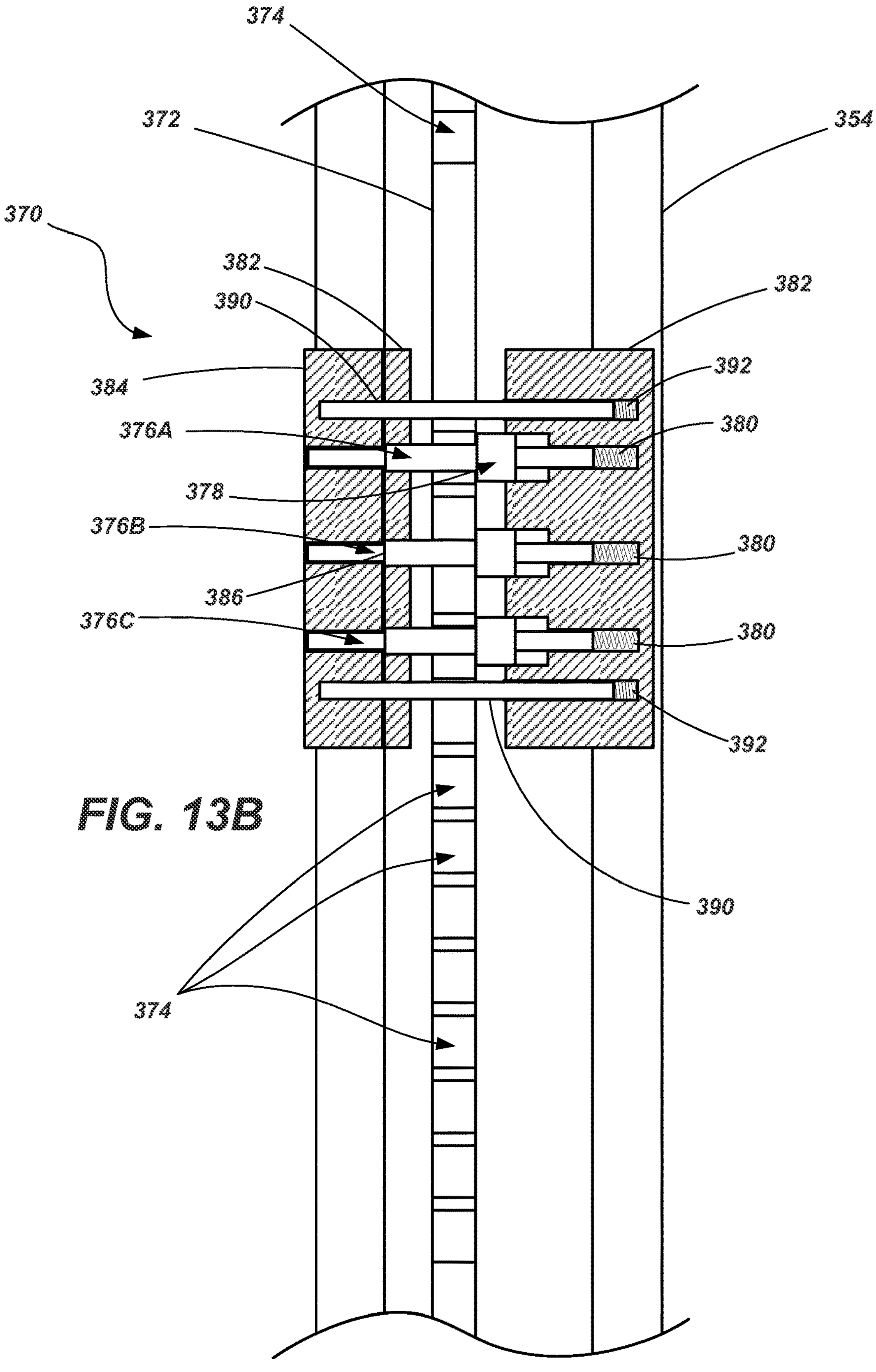
Figure 13C:
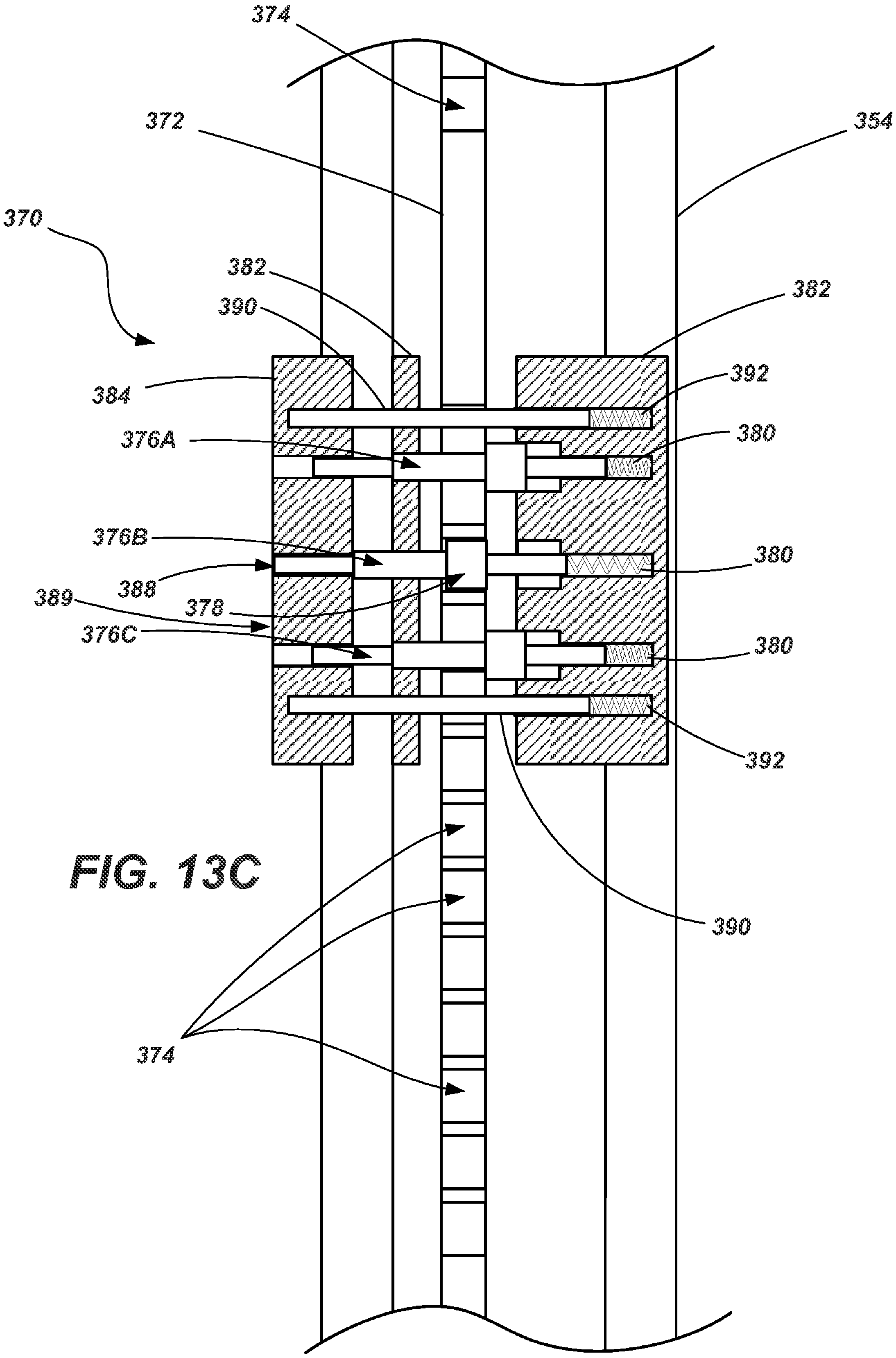

The pins 376 are configured to be displaced such that they can slide into and out of engagement with a scallop 374 when aligned therewith. Biasing members 380 (e.g., springs or other appropriate structures or devices) are associated with each of the engagement pins 376 to bias the pins towards engagement with a scallop 374. The pins 376 and biasing members 380 (FIG. 12) may be associated with a body 382 (only partially shown in FIG. 11 in order to show other components, shown schematically in FIG. 12 in dashed lines for clarity), the pins 376 being slidably disposed within associated openings or channels formed in the body 382. The body 382 may be slidably coupled to the first component 372, the rail 354 or some other component associated with the rail 354, such that it may be selectively displaced along a longitudinal extent of the rail 354. It is noted that the body 382, as shown in FIGS. 13A-13C, is shown in two portions (one portion on each side of the first component 372) due to the cross-sectional nature of the drawing. In one embodiment, the body 382 could be formed as a single component, in other embodiments, the body may include various components coupled with one another as will be appreciated by those of ordinary skill in the art.

The adjustment mechanism 370 further includes an actuator, such as a handle 384, configured to displace all of the pins 376 out of engagement with the scallops 374 such that the body 382, pins 376 and related components may be slidably displaced along the rail 354 (an relative to the first component 372). When the handle is released, the forces applied by the biasing members 380 cause one of the pins 376 to slide into engagement with a scallop 374 when it becomes aligned as the body 382 (along with the pins 376 and associated components) are slidably displaced relative to the first component and its plurality of scallops 374.

For example, referring to FIGS. 13A-13C, a partial cross-sectional view of the adjustment mechanism 370 is shown in various states of operation. As shown in FIG. 13A, a first pin 376A is engaged with one of the scallops 374 formed in the first component. Because of the spacing or pitch of the scallops, along with the spacing of the pins 376, only a single pin is aligned with a scallop at a given time. Thus, the other two pins 376B and 376C are not engaged with any scallops 374, but, rather, are abutting a surface of the first component 372 along the side of the column of scallops 374.

In one embodiment, the scallops 374 may be spaced from each other along a longitudinal axis at a distance of approximately 0.6 inch (center to center) and exhibit a "depth" from the top surface of the first component 372 to the lowest point of the concave scallop of approximately 0.13 inch. The pins 376A-376C may be spaced, for example, approximately 0.8 inch from each other (center to center). Using such spacing, the body 182 (and associated components) may be adjusted relative to the rail 354 and associated first component in increments of approximately 0.2 inch. Of course, in other embodiments, such sizes and relationships may be changed for greater or smaller increments of adjustment.

As shown in FIG. 13B, when the handle 384 or actuator is displaced inwardly, it engages a shoulder 386 of the engagement pins 376 and, when a force sufficient to displace the various biasing members is applied, results in the displacement of all of the pins 376A-376C away from the scallops 374. When in this state, the body 382, pins 376, and ultimately the leg member 362, may be displaced in either direction along the length of the side rails 354. Displacement of the leg member 362 as described can provide considerable adjustment for the ladder 350 in terms of vertical/elevation adjustment, lateral adjustment or both.

When the handle 382 is released, the biasing members 380 press the pins 376 against the surface of the aligned scallops 374 until one of the pins is aligned with a scallop and it engages therewith. For example, as shown in FIG. 13C, the second pin 376B has become aligned with and engaged a scallop 374 while the other pins 376A and 376C are not aligned and not engaged with an scallops. With any one of the pins 376A-376C being aligned with and engaged with a scallop 374 (the pin 376 being in abutting contact with the engagement surface), the body 382 and pins 376 are prevented from being displaced relative to the first component 372 and associated rail 354.

In one embodiment, the ends 388 of the pins 376 (FIG. 13C) may be seen through the side surface 389 of the handle 384 (e.g., through an opening in the surface of the handle 384) when a given pin is engaged with a scallop 374. This provides a positive indication to a user that a pin is affirmatively engaged with a scallop 374 and, therefore, that it is safe to climb on the ladder 350. In one embodiment, the ends 388 of the pins 376 may be colored (e.g., green or some bright, easily distinguished color) to better provide a quick indication to the user that the engagement pin 376 is engaged with a scallop 374.

As seen in FIGS. 11, 12 and 13A-13C, the adjustment mechanism may include a variety of other components. For example, alignment pins 390 and associated biasing members 392 may be coupled with the body 382 and the handle 382 to accommodate the displacement of the handle 384 relative to the body 382, with the biasing members 394 causing the handle to return to a disengaged/unactuated state when a user releases a force from the handle 384, even if none of the pins 376 have engaged a scallop 374.

Additionally, it is noted that a cover may be disposed about, for example, the body 382, engagement pins 376 and various other components. The cover may keep dirt and debris from entering into the mechanism 370 which might otherwise damage components or degrade the operability of the mechanism. It may also keep a user's fingers or clothes from getting caught or pinched within the device (e.g., by the pins 376 when sliding between engaged and disengaged positions).

While described in association with a stabilizer for an extension ladder, it is noted that the adjustment mechanism described with respect to FIGS. 11-13C may be utilized with other components and devices. For example, the adjustment mechanism may be used in association with the leveler described above, with other stabilizer devices or with any two components that are slidably disposed relative to each other, where it is desired to selectively and securely position the two components in two or more positions relative to each other. Similarly, as noted above, the adjustment mechanisms of other described embodiments may be used with the stabilizer arrangements described with respect to FIGS. 11-13C. For example, the adjustment mechanism described with respect to FIGS. 1-7D may be used in association with a stabilizer arrangement described with respect to FIGS. 11 and 12 (and the incorporated U.S. Pat. No. 8,365,865). In one particular embodiment, such an adjustment mechanism (e.g., described with respect to FIGS. 1-7D) may be further modified so that the engagement pins 162 do not include an angled engagement surface 166, and the openings 150 are substantially circular such that the pull ring 142 must be actuated in order to effect relative displacement of one component in either (i.e., both) directions along a defined axis relative to another associated component (e.g., the upper end of a leg 362 relative to a rail 354).

While the invention may be susceptible to various modifications and alternative forms, specific embodiments have been shown by way of example in the drawings and have been described in detail herein. However, any features or components of a given embodiment may be combined, without limitation, with features or components of any other described embodiment. Additionally, it should be understood that the invention is not intended to be limited to the particular forms disclosed. Rather, the invention includes all modifications, equivalents, and alternatives falling within the spirit and scope of the invention as defined by the following appended claims.

What is claimed is:

1. A ladder comprising:

a rail assembly comprising:

a pair of inner rails and a pair of outer rails, the pair of inner rails being slidably disposed within the pair of outer rails;

a first plurality of rungs coupled between the pair of inner rails; and a second plurality of rungs coupled between the pair of outer rails;

a pair of leveler mechanisms associated with the pair of outer rails, each leveler mechanism of the pair of leveler mechanisms comprising:

a leg member slidably disposed within a respective outer rail of the pair of outer rails, wherein a plurality of openings is defined in the leg member, the plurality of openings having upper surfaces and lower surfaces, wherein the upper surfaces and the lower surfaces are flat and parallel;

an actuating mechanism configured to permit longitudinal movement of the leg member relative to the respective outer rail in a first direction and, when actuated, in a second, opposite direction;

wherein the actuating mechanism is configured to allow movement of the leg member in only the first direction when not actuated;

wherein, in response to displacement of the leg member in the first direction:

multiple engagement protrusions of the actuating mechanism transition in and out of openings of the plurality of openings of the leg member without affirmative application of force to the actuating mechanism, and at least two engagement protrusions of the multiple engagement protrusions maintain constant contact with the leg member, including when the at least two engagement protrusions are positioned outside the openings, when the at least two engagement protrusions are positioned inside the openings, and when the at least two engagement protrusions are transitioning therebetween; and a spring to maintain a biasing force on the leg member in the second direction.

2. The ladder of claim 1, wherein the actuating mechanism is positioned on an outer rail of the pair of outer rails independent of the second plurality of rungs.

3. The ladder of claim 1, wherein the actuating mechanism is spaced apart from the second plurality of rungs.

4. The ladder of claim 1, wherein the actuating mechanism is positioned at a laterally inner portion of the respective outer rail.

5. The ladder of claim 1, wherein in response to actuation of the actuating mechanism, the biasing force is configured to retract the leg member into a lower portion of the respective outer rail.

6. The ladder of claim 1, wherein at least one of the multiple engagement protrusions is in contact with the leg member when the leg member is displaced in the first direction without the affirmative application of force to the actuating mechanism.

7. The ladder of claim 1, further comprising a second spring applying a second biasing force configured to bias the actuating mechanism against the leg member; and wherein in response to the displacement of the leg member in the first direction without the affirmative application of force to the actuating mechanism, the second biasing force from the second spring is continually overcome.

8. A ladder comprising:

a rail assembly comprising:

a pair of inner rails, a pair of outer rails, wherein the pair of inner rails is slidably disposed in upper portions of the pair of outer rails;

a first plurality of rungs coupled between the pair of inner rails; and a second plurality of rungs coupled between the pair of outer rails;

at least one leveler mechanism, comprising:

a leg member slidably disposed within a lower portion of an associated outer rail of the pair of outer rails;

an actuator to selectively control longitudinal movement of the leg member relative to the lower portion of the associated outer rail, the actuator including multiple engagement features configured to selectively engage the leg member, wherein in response to withdrawal of the leg member from the lower portion of the associated outer rail without user input directly to the actuator, at least two engagement features of the multiple engagement features remain in contact with the leg member at all times during the withdrawal; and a bracket coupled to the associated outer rail and bridging across an opening into an interior channel formed in the associated outer rail, the bracket preventing lateral displacement of the leg member out of the interior channel through the opening.

9. The ladder of claim 8, wherein the interior channel is a C-channel.

10. The ladder of claim 8, wherein the longitudinal movement of the leg member relative to the lower portion of the associated outer rail is selectively controlled by the positioning of the multiple engagement features relative to the leg member.

11. The ladder of claim 8, wherein the bracket extends to a bottom end of the associated outer rail.

12. The ladder of claim 8, wherein the bracket is a first bracket, and the leveler mechanism further comprises a second bracket.

13. The ladder of claim 12, wherein the second bracket is positioned above the first bracket and the actuator when the ladder is in a free standing position.

14. The ladder of claim 8, wherein opposing sides of the bracket are respectively connected to front and rear surfaces of the associated outer rail, the front and rear surfaces adjoining a laterally outward exterior surface of the associated outer rail.

15. The ladder of claim 8, further comprising a brace connecting a bottom-most rung of the second plurality of rungs to at least the bracket.

* * * * *